(12) United States Patent
Figueroa et al.

(10) Patent No.: US 11,218,228 B2
(45) Date of Patent: Jan. 4, 2022

(54) DEVICES, SYSTEMS, AND METHODS FACILITATING AMBIENT-TEMPERATURE QUANTUM INFORMATION BUFFERING, STORAGE, AND COMMUNICATION

(71) Applicant: The Research Foundation for The State University of New York, Albany, NY (US)

(72) Inventors: Eden Figueroa, Setauket, NY (US); Mehdi Namazi, Brooklyn, NY (US); Mael Flament, Port Jefferson, NY (US)

(73) Assignee: The Research Foundation for The State University of New York, Albany, NY (US)

( * ) Notice: Subject to any disclaimer, the term of this patent is extended or adjusted under 35 U.S.C. 154(b) by 0 days.

(21) Appl. No.: 17/042,054

(22) PCT Filed: Mar. 28, 2019

(86) PCT No.: PCT/US2019/024601
§ 371 (c)(1),
(2) Date: Sep. 25, 2020

(87) PCT Pub. No.: WO2019/191442
PCT Pub. Date: Oct. 3, 2019

(65) Prior Publication Data
US 2021/0028865 A1 Jan. 28, 2021

Related U.S. Application Data

(60) Provisional application No. 62/729,788, filed on Sep. 11, 2018, provisional application No. 62/696,219, (Continued)

(51) Int. Cl.
*H04B 10/00* (2013.01)
*H04B 10/70* (2013.01)
(Continued)

(52) U.S. Cl.
CPC ............. *H04B 10/70* (2013.01); *G06N 10/00* (2019.01); *H04B 10/077* (2013.01)

(58) Field of Classification Search
CPC ............................... H04B 10/70; G06N 10/00
See application file for complete search history.

(56) References Cited

U.S. PATENT DOCUMENTS

2019/0164607 A1* 5/2019 Kaczmarek .......... G11C 13/048

OTHER PUBLICATIONS

International Search Report and Written Opinion dated Jun. 27, 2019 in connection with International Application No. PCT/US2019/024601.

(Continued)

*Primary Examiner* — Daniel G Dobson
(74) *Attorney, Agent, or Firm* — Wolf, Greenfield & Sacks, P.C.

(57) ABSTRACT

Devices, systems, and methods for ambient-temperature quantum information buffering, storage, and communication are provided enabling receiving a quantum communication (for example, photons holding quantum information, e.g., qubits), storing the qubits in a room-temperature scalable quantum memory device, selectively retrieving the qubits, performing filtering, and extracting the quantum communication with a controllable delay.

22 Claims, 24 Drawing Sheets

Related U.S. Application Data filed on Jul. 10, 2018, provisional application No. 62/649,275, filed on Mar. 28, 2018.

(51) Int. Cl.
*G06N 10/00* (2019.01)
*H04B 10/077* (2013.01)
*H04J 14/00* (2006.01)

(56) References Cited

OTHER PUBLICATIONS

International Preliminary Report on Patentability dated Oct. 8, 2020 in connection with International Application No. PCT/US2019/024601.

Kupchak et al., Room-temperature single-photon level memory for polarization states. Scientific Reports. Jan. 7, 2015;5(1):1-5.

Namazi et al., Free-space quantum communication with a portable quantum memory. Physical Review Applied. Dec. 14, 2017;8(6):064013. 7 pages.

Michelberger, Room temperature caesium quantum memory for quantum information applications. arXiv preprint arXiv: 1706.01104. Jun. 4, 2017. 435 pages.

\* cited by examiner

DEVICES, SYSTEMS, AND METHODS FACILITATING AMBIENT-TEMPERATURE QUANTUM INFORMATION BUFFERING, STORAGE, AND COMMUNICATION

CROSS-REFERENCE TO RELATED APPLICATIONS

This application is a national stage filing under 35 U.S.C. 371 of International Patent Application Serial No. PCT/US2019/024601, filed Mar. 28, 2019, entitled "DEVICES, SYSTEMS, AND METHODS FACILITATING AMBIENT-TEMPERATURE QUANTUM INFORMATION BUFFERING, STORAGE, AND COMMUNICATION", which claims the benefit of U.S. Provisional Patent Application No. 62/649,275, filed on Mar. 28, 2018, U.S. Provisional Patent Application No. 62/696,219, filed on Jul. 10, 2018, and U.S. Provisional Patent Application No. 62/729,788, filed on Sep. 11, 2018, the entire contents of each of which is hereby incorporated herein by reference.

BACKGROUND

Technical Field

The present disclosure relates to quantum communication and, more particularly, to devices, systems, and methods facilitating ambient-temperature quantum information buffering, storage, and communication.

Background of Related Art

Quantum communication technologies can revolutionize the communications industry, e.g., the storage, the transmission, and the processing of information, particularly because of their ability to enable fully secured communications.

While robust cryptographic techniques currently exist, these techniques are susceptible to hacking, and there is a strong possibility that powerful-enough computers and sophisticated hackers could eventually break today's most robust cryptographic techniques. Should a means to break these techniques be found, many communications using these techniques, including stored past communications, could become vulnerable.

Contrary to current cryptographic techniques, which are mostly based on advanced mathematics, quantum communication is based on the physical laws of nature, e.g., quantum physics. The principles of quantum physics enable the creation of fundamentally secure quantum communication techniques such as, for example, Quantum Key Distribution (QKD). QKD is a fundamentally secure communication technique where any attempt by an eavesdropper to intercept a communication introduces anomalies that can be detected by the communicating parties. This results from an essential aspect of quantum mechanics—that the process of measuring a quantum system necessarily disturbs the system.

Despite the significant advantage of being able to provide fully-secured communications, quantum communication techniques are not ubiquitous. This is due, in part, to the difficulties of counteracting transmission loss in fibers and storing (or buffering) the quantum information.

When transmission over long-distances is required, measures must be taken to counteract the unavoidable losses of the transmitted signal. With respect to traditional communications, a signal repeater receives, amplifies (or replicates), and forwards the signal. However, for quantum communications the solution of a quantum repeater is not so simple. Here, the same fundamental physics principle that protects against eavesdroppers also prevents the direct amplification of quantum information (qubits).

Consequently, there is a need for devices, systems, and methods facilitating quantum information buffering, storage, and communication. For such devices to become widespread and be adopted by telecommunication industries, their cost and operations must be streamlined. In particular, to be truly scalable, such devices should not use environment-controlling systems such as cryogenics, laser, and/or vacuum.

SUMMARY

The present disclosure provides devices, systems, and methods facilitating ambient-temperature quantum information buffering, storage, and communication. These devices, systems, and methods enable long-distance transmission of quantum communications at ambient temperatures such as for use in Quantum Key Distribution (QKD) links, quantum repeaters, and/or other quantum communication networks which involve quantum memories. Such devices, systems, and methods match the criteria for mass adoption, field operation, and scalability.

The devices, systems, and methods of the present disclosure have advantageous operation capabilities and technical characteristics in that they, for example: (1) are comparable to cryogenic and cold-atom alternatives in terms of technical specifications (e.g., storage time and fidelity); (2) work unconditionally (without requiring control changes in order to store different polarizations) for arbitrary polarizations of light (enabling storage of fundamental particles of light (photons) and the quantum information decoded on the photons as polarization, and successful retrieval of the photon polarization with fidelities above 90%); (3) are suitable for any photon-based quantum application and capable of storing randomized photons in a shot-by-shot experiment up to MHz repetition rates, a key feature necessary for any long-distance quantum cryptography, quantum secure networks, and quantum repeaters); (4) are compatible with both fiber-optics and free-space communication methods (e.g., satellite to earth communication) by using a vapor medium that allows the memory to be suitable for photons with modified temporal and spatial shapes (e.g., due to the atmospheric noise); (5) provide portable, ambient-temperature, plug-and-play quantum memories to enable the establishment of repeater-backed quantum networks; and (6) provide scalable, cost-friendly, and maintenance friendly quantum memories without the need for cryogenic cooling, laser cooling, and/or vacuum systems thereby reducing size, cost, and maintenance considerations.

The above and other aspects and features of the present disclosure are detailed below. To the extent consistent, any of the aspects and features of the present disclosure may be utilized in conjunction with (or without) any of the other aspects and features of the present disclosure.

A portable, ambient-temperature operating, quantum memory device provided in accordance with aspects of the present disclosure includes an inner structural frame, an outer shell surrounding the inner structural frame, a probe input configured to receive a probe-field photon beam (anywhere from a continuous light level to single-photon quantum light pulses) including quantum information in the form of polarization qubits, a control input configured to receive a control-field photon beam for storage and slow-down control, a dual-rail quantum memory module disposed within the outer shell (and including a magnetic shielding structure) and supported by the inner structural frame, and a filtering module, e.g., including a plurality of filtering components, disposed within the outer shell and supported by the inner structural frame. The dual-rail quantum memory module is coupled to the probe input for receiving the probe-field photon beam, and coupled to the control input for receiving the control-field photon beam, thereby enabling storage of the quantum information within a pair of atomic vapor cells of a vapor cell assembly of the dual-rail quantum memory module. The filtering module is coupled, e.g., attached, to the dual-rail quantum memory module and configured to retrieve the quantum information therefrom. The output of the quantum memory device is configured to output the quantum information from the filtering module, e.g., to a processing device.

In an aspect of the present disclosure, the dual-rail quantum memory module is configured to store the polarization encoded (qubit) quantum information as photons of two independent photon beams, each of the independent photon beams consisting of a combined beam formed from a polarization-split beam of the probe-field photon beam and a polarization-split beam of the control-field photon beam.

In another aspect of the present disclosure, the atomic vapor cells contain Rubidium 87 atoms and a buffer gas of, for example, Kr and/or Neon. Other atoms such as Cs can also be used instead of Rubidium 87. The vapor cells are parallel to each other, mechanically mounted, and controlled in such a way that the temperature is uniform along their entire length.

In another aspect of the present disclosure, the dual-rail quantum memory module further includes at least two heaters configured to heat the vapor cell and at least one controller configured to control and monitor the aforementioned heaters to thereby control the temperature of the vapor cells. The heaters are configured in such a way that they produces no, or minimal, magnetic fields in the region near the cells.

In yet another aspect of the present disclosure the heaters and vapor cells are shielded by multiple layers of mu-metal to significantly reduce the magnetic field in the cell region. This shielding is optimized both in geometrical configuration and thickness. The multiple layers of shielding are concentric within each other and assembled in such a way to permit easy replacement or removal of the vapor cells.

In yet another aspect of the present disclosure, the dual-rail quantum memory module takes advantage of the phenomena of Electromagnetically Induced Transparency (EIT) for storage in both rail, enabling up to 500 µs storage time.

In still another aspect of the present disclosure, the filtering module is configured to retrieve the quantum information as photons of two independent photon beams. Each of the independent photon beams is a merged beam formed via a split beam of the probe-field photon beam and a split beam of the control-field photon beam portion.

In still yet another aspect of the present disclosure, the filtering module is configured to combine the two independent photon beams into a first beam, split the first beam into separate beams, and re-combine the separate beams into a second beam for output via the output. This configuration is referred to as dual-rail operation.

In another aspect of the present disclosure, the filtering module is configured to perform filtering before splitting the first beam, between splitting the first beam and re-combining the separate beams, and/or after re-combining the separate beams. In total, this enables at least 50 dB attenuation of the control beam with respect to the probe photons.

In an aspect of the present disclosure, a mechanical mounting layer or board disposed within the outer shell or casing and supported by the inner structural frame supports the quantum memory module and defines a first tier. This layer, e.g., the quantum memory module, permits storage of light for either photon packets (classical light pulses) or for single photons (qubits). An additional mounting layer or board permits filtering for retrieval of single photons and is disposed within the outer shell or casing, supported by the inner structural frame, supporting the filtering module thereon, and defining a second tier.

A method of ambient-temperature quantum communication storage provided in accordance with aspects of the present disclosure includes receiving a probe-field photon beam, splitting the probe-field photon beam into first and second independent probe beams, receiving a control-field photon beam, splitting the control-field photon beam into first and second independent control beams, merging the first and second independent control-field beams with the respective first and second independent probe beams to provide two independent, merged beams, and storing the two independent merged, beams in the quantum memory's vapor cells.

In an aspect of the present disclosure, the method further includes preparing the control-field photon beam by, for example, matching the wavelength of the control-field photon beam with the wavelength of the probe-field photon beam (e.g., phase-lock) and/or time-optimizing the control-field photon beam to the probe-field photon beam.

In another aspect of the present disclosure, the probe-field photon beam is a pulsed beam wherein each pulse contains, on average, one photon (qubit).

In yet another aspect of the present disclosure, when the vapors cells used are Rb87 atoms, the probe-field photon beam has a wavelength of 795 nm. Other wavelengths such as between 780 nm and 850 nm are also contemplated.

A method of ambient-temperature output of a stored qubit (quantum information) provided in accordance with the present disclosure includes retrieving quantum information stored in a quantum memory (wherein the retrieved quantum information is in the form of two independent photon beams), combining the two independent photon beams into a first beam, splitting the first beam into separate beams, re-combining the separate beams into a second beam, and performing filtering before splitting the first beam, between splitting the first beam and re-combining the separate beams, and/or after re-combining the separate beams.

In still another aspect of the present disclosure, performing filtering includes using a Polarization Beam Splitter followed by two Fabry-Perot etalon cavities and a Faraday isolator to achieve at least 40 dB isolation.

In another aspect of the disclosure, the Fabry-Perot cavities are tuned by changing their length by precisely tuning the temperature of the optical elements using an automated tuning scheme. Frequency filtering tuning can additionally or alternatively be achieve by precision alignment.

A method of ambient-temperature quantum communication provided in accordance with aspects of the present disclosure includes receiving a qubit (quantum information) from the probe-field photon beam, splitting the probe-field photon beam into first and second independent probe beams, receiving a control-field photon beam, splitting the control-field photon beam into first and second independent control-field beams, merging the first and second independent control-field beams with the respective first and second independent probe-field beams to provide two independent, merged beams, storing the two independent, merged beams in a quantum memory vapor cell, retrieving the two independent, merged beams from the quantum memory vapor cell, combining the two independent, merged beams into a first beam, splitting the first beam into separate beams, re-combining the separate beams into a second beam, and performing filtering before splitting the first beam, between splitting the first beam and re-combining the separate beams, and after re-combining the separate beams.

BRIEF DESCRIPTION OF THE DRAWINGS

Various aspects and features of the present disclosure are described hereinbelow with reference to the drawings wherein like numerals designate similar elements in each of the several views and.

DETAILED DESCRIPTION

Figure 1:
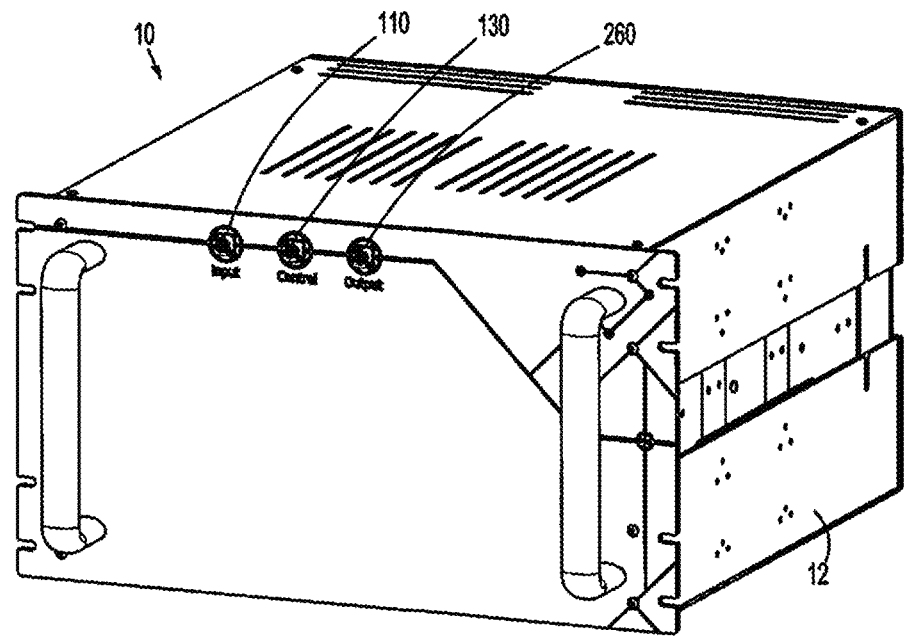
FIG. 1 is a perspective view of a quantum memory device provided in accordance with the present disclosure, illustrated as rack-mountable and including three fiber inputs/outputs (probe input, control input, and output)

The following detailed description is made with reference to the accompanying drawings, wherein explanations regarding components, functions, or constructions known in the art are summarily provided or omitted entirely in an effort to avoid obscuring the aspects and features of the present disclosure with unnecessary details. In addition, any particular values or ranges detailed herein are understood to encompass variations within limits generally accepted in the art, wherein such variations are due to, for example, margins of error in measurement and/or feedback-based control systems, material and system margins of error and tolerances, environmental conditions, manufacturing tolerances, etc.

Quantum Memory

Referring to FIGS. 1-3C, an ambient-temperature quantum memory device in accordance with the present disclosure is shown and generally identified by reference numeral 10. For the purposes herein, "ambient temperature" refers to temperatures that are not controlled for the purpose of quantum storage/communication, e.g., non-laboratory-controlled temperatures, temperatures not influenced by one or more of cryogenic cooling systems, laser cooling systems, vacuum systems, etc. "Ambient temperatures" may include room temperatures, environment temperatures (e.g., 0° C. to 100° C.), or the like. The main challenges for developing such an ambient-temperature quantum memory device 10 are defeating the inherent strong atomic motion, de-coherence, and noise, e.g., background photons, without the need for extreme cooling or vacuum systems. Quantum memory device 10, described in detail below, overcomes these challenges.

Quantum memory device 10 is configured to: 1) receive, at an input "I" (FIG. 3A), a quantum communication such as, for example, photons storing quantum information, e.g., polarization qubits; 2) store the photons within quantum memory module 100 thereof; 3) selectively retrieve the photons and perform filtering via filtering module 200; and 4) send the photons as a quantum communication from an output "O." Quantum memory device 10, more specifically, allows for independent channels performing Quantum Key Distribution (QKD) using the BB84 protocol and polarization qubits; works with arbitrary polarization qubits with retrieval fidelities greater than 90% and with fidelities greater than 98% upon using the auxiliary field filtering scheme detailed below; provides for the storage of randomized photons in a shot-by-shot manner; and enables creation of a long-distance quantum secure network utilizing one or more of such quantum memory devices 10 at ambient-temperatures and outside the controlled laboratory setting.

Figure 2:
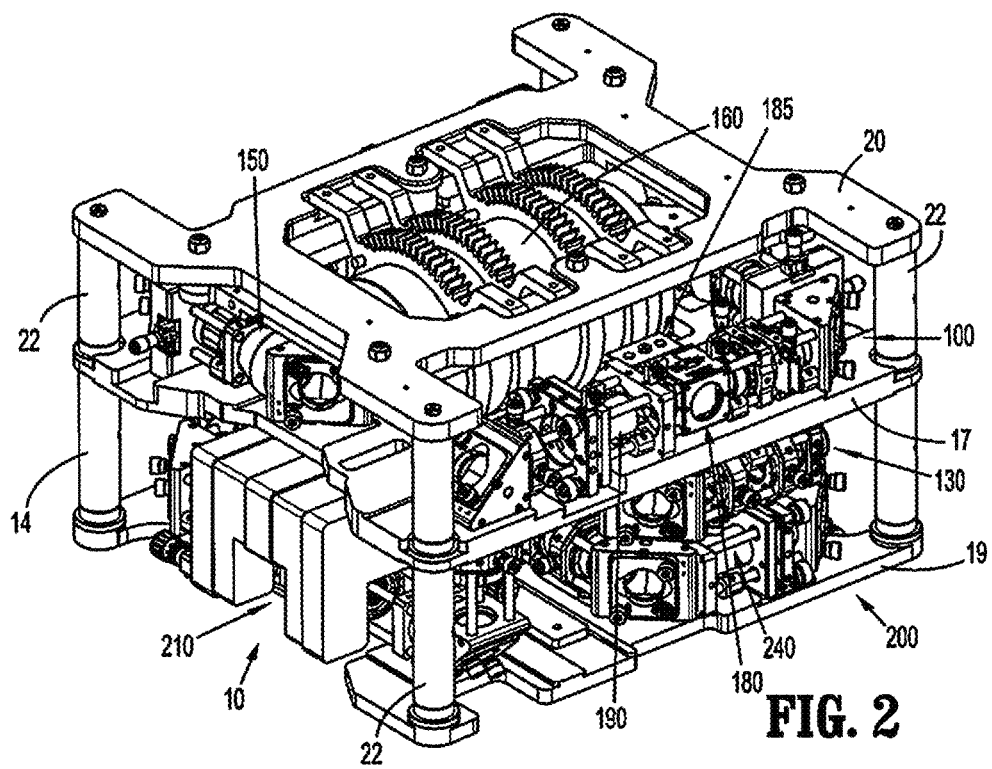
FIG. 2 is a perspective view of the quantum memory device of FIG. 1 with the outer shell removed to illustrate the internal components and features therein.
Figure 4:
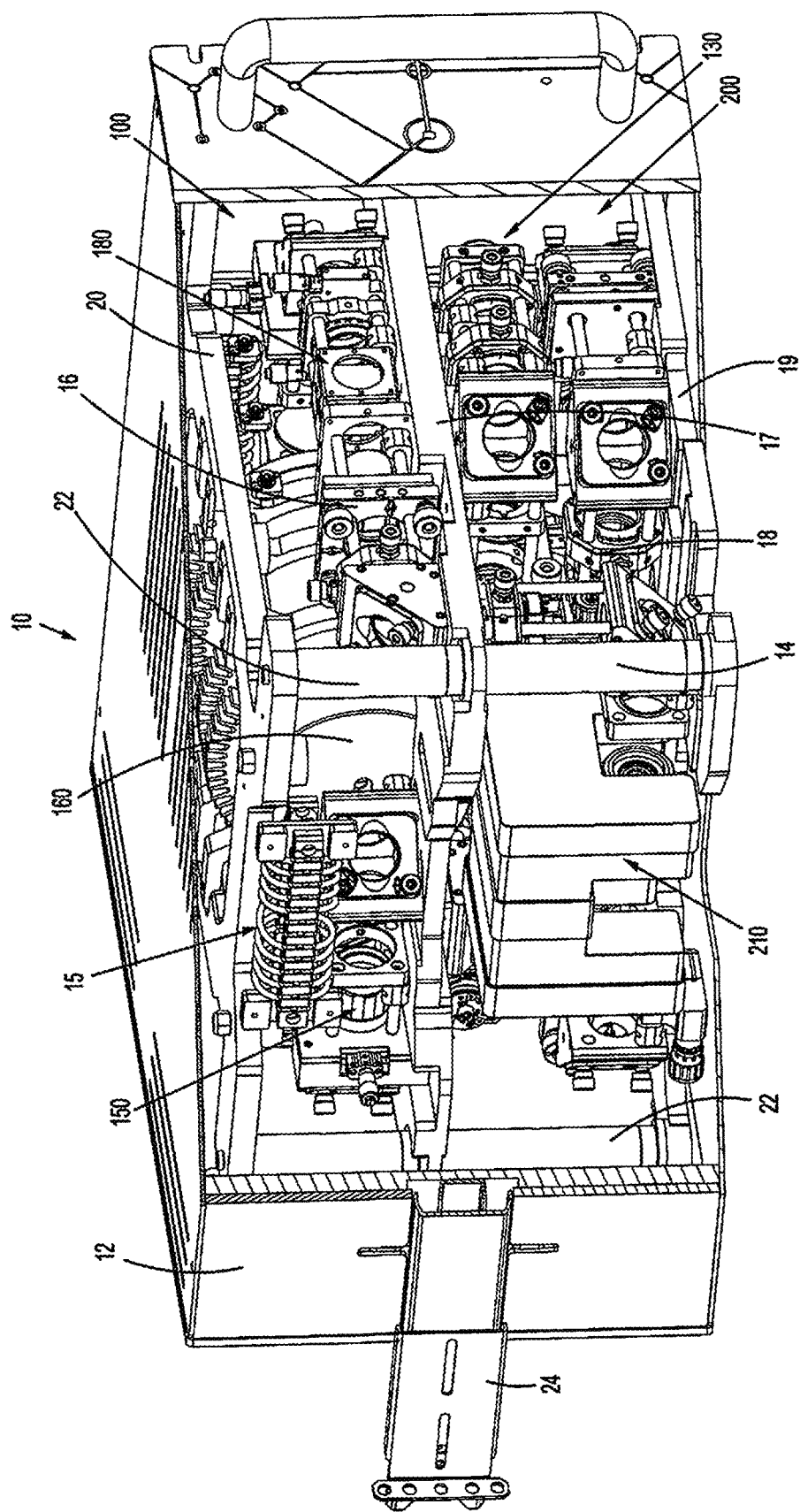
FIG. 4 is a corner, partial section view, with portions of the outer shell removed to show the inside of the quantum memory device of FIG. 1.

Quantum memory device 10, as illustrated in FIGS. 1, 2, and 4, includes an outer shell 12 and an inner structural frame 14 disposed within outer shell 12. Outer shell 12 is at least partially formed from, or coated with, magnetic shielding material to inhibit electromagnetic interference passing through outer shell 12. Inner structural frame 14 supports the operable internal modules of quantum memory device 10: quantum memory module 100 and filtering module 200. Inner structural frame 14 includes a plurality of vibration dampeners 15, e.g., shock-mount coils and grommets, configured to inhibit or at least dampen external vibrations from reaching the internal operating components and optical elements of quantum memory device 10.

Figure 3A:
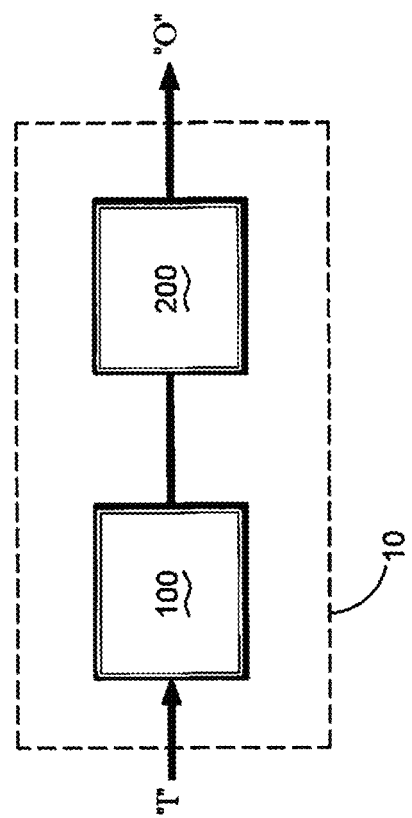
FIG. 3A is a block diagram of the quantum memory device of FIG. 1 illustrating storage and filtering modules thereof.
Figure 3B:
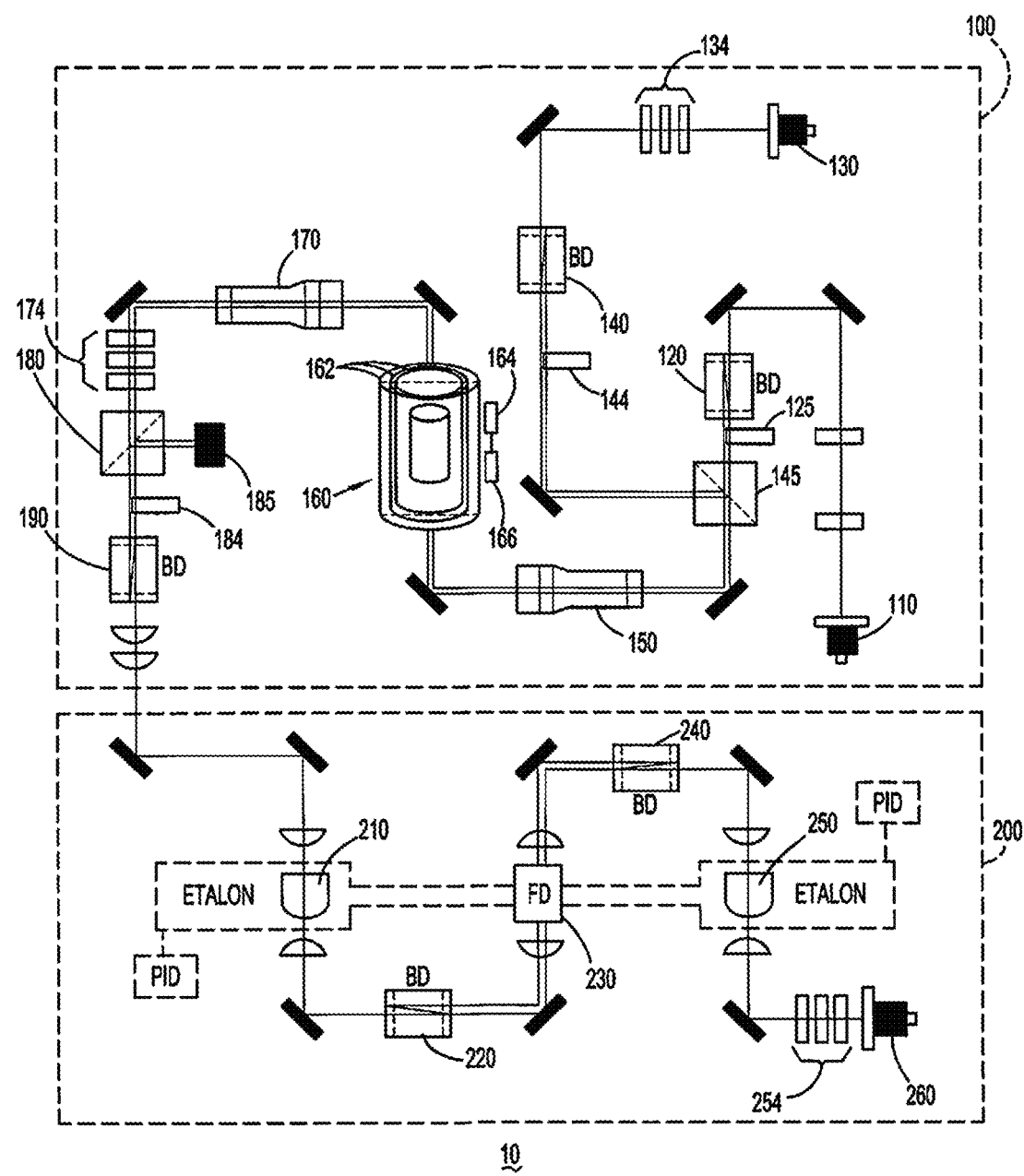
FIG. 3B is a schematic diagram of the quantum memory device of FIG. 1 illustrating the storage and filtering modules thereof.
Figure 3C:
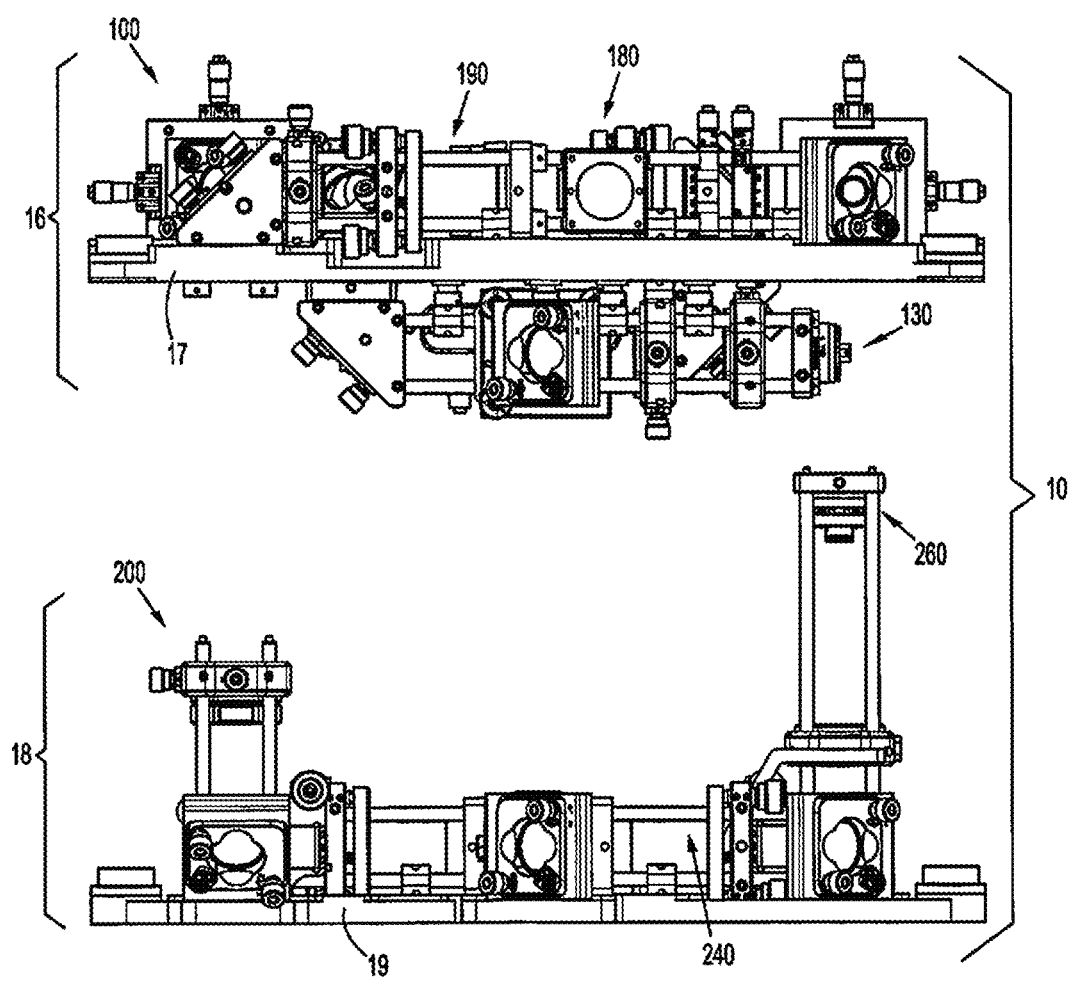
FIG. 3C is a side view of the storage and filtering modules of the quantum memory device of FIG. 1.
Figure 3D:
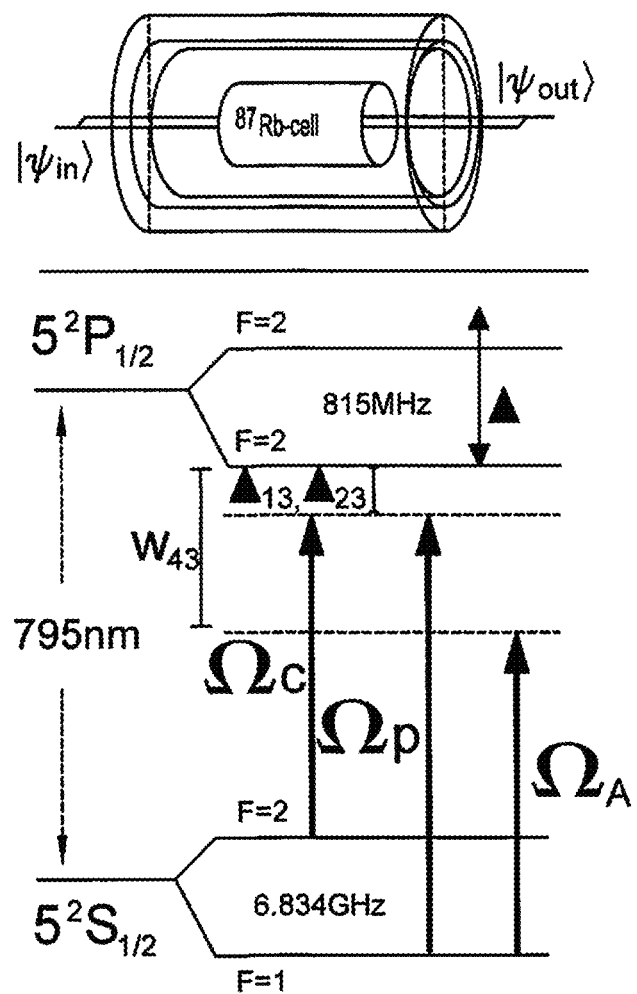
FIG. 3D is a four-level scheme for Rubidium 87 illustrating the transitions thereof.

Referring to FIGS. 3A-3C, quantum memory module 100 and filtering module 200 are detailed. For the purposes of brevity, features and components known in the art and not germane to the understanding of quantum memory module 100 and filtering module 200 are not described herein such as, for example, lenses, mirrors, etc., as it is understood that a person of skill in the art would readily understand how to implement and utilize such components, as necessary, in making and using quantum memory module 100 and filtering module 200. Further, various different configurations and ordering of components may be provided without departing from the scope of the present disclosure as illustrated and/or detailed herein.

As best shown in FIG. 3B, and with additional reference to FIGS. 15-17, and 21, quantum memory module 100 is configured as an Electromagnetically Induced Transparency (EIT) based quantum memory and includes a probe input 110 configured to receive a quantum communication in the form of a photon beam, from input "I." The photon beam, referred to as the probe-field photon beam, may be pulsed, with each pulse on average containing one (1) qubit, and a wavelength of 795 nm, although other suitable wavelengths or wavelength ranges are also contemplated, e.g., wavelengths between 780 nm and 850 nm. The probe-field photon beam can be produced, for example, by extreme attenuation of a laser beam or through various optical processes such as parametric down conversion or single photon sources (e.g., quantum dots). An exemplary probe-field photon beam preparation configuration is detailed below with respect to FIG. 22.

A first beam displacer 120 splits the probe-field photon beam into two orthogonally polarized probe-field photon beams, which are parallel to and independent of one another. The first beam displacer 120 may be a birefringent crystal that allows the vertical component of a polarization to pass straight through while displacing the horizontal component. Between the input 110 and the first beam displacer 120, a plurality of rotating wave plates may be provided to compensate for the unitary polarization rotation of the optical fiber providing the input photon beam to probe input 110. A half wave plate 124 positioned after the first beam displacer 120 rotates the polarization of one of the beams to enable both beams, or rails, to pass through a first Glan-Thomson polarizing beam splitter 145 and into the atomic vapor cell assembly 160, as detailed below.

Quantum memory module 100 further includes a control input 130 configured to receive a control-field photon beam that is pulsed, in the order of a few mW, and of the same or nearly (within acceptable limits) the same wavelength as the probe-field photon beam, and time-optimized to the probe-field photon beam. One configuration of the preparation of the control-field photon beam and a configuration of input preparation to achieve resonance, the same wavelength, and time-optimization between the probe-field photon beam and the control-field photon beam are detailed below with respect to FIG. 22.

The control-field photon beam, upon receipt, may be passed through a telescope (not shown in FIG. 3B) to ensure that the control field rails fully cover the probe rails. Thereafter, the control-field photon beam is directed through a plurality of wave plates 134 to a second beam displacer 140 which splits the control-field photon beam into two control-field photon beams, which are parallel to and independent of one another; each control-field photon beam corresponding to one of the probe-field photon beams. The control-field photon beams are directed to the first Glan-Thomson (or other suitable type) polarizing beam splitter 145 which merges the control-field photon beams with the corresponding probe-field photon beams. A half wave plate 144 rotates the polarization of one of the beams prior to enable both beams, or rails, to pass through the first Glan-Thomson polarizing beam splitter 145 and into the atomic vapor cell assembly 160, as detailed below.

Figure 10:
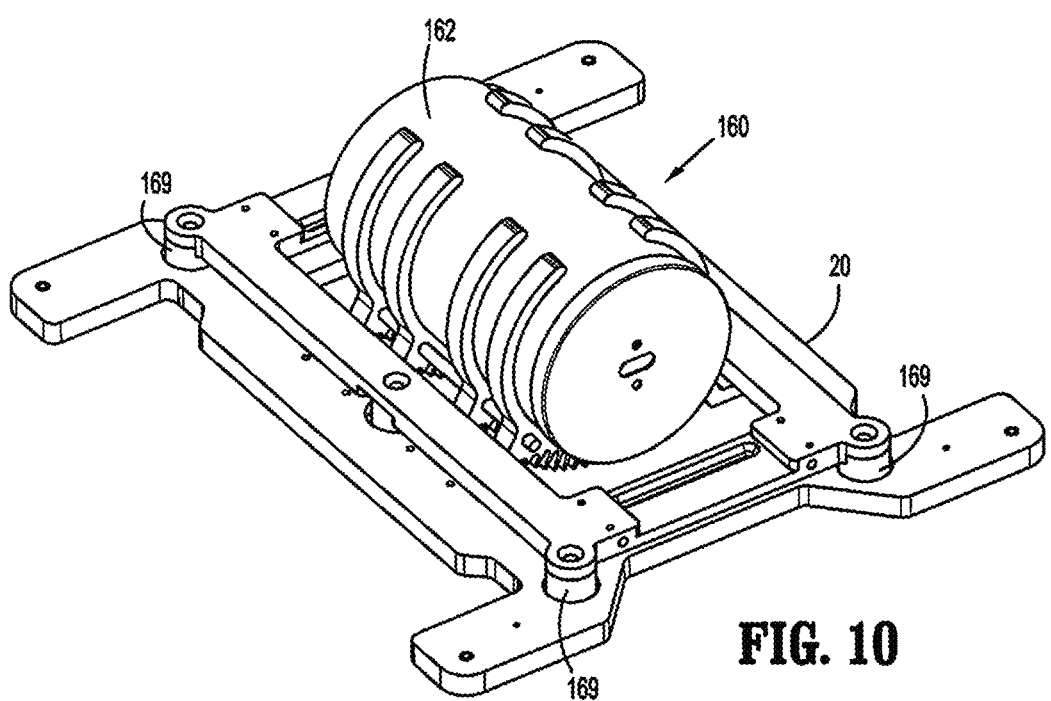
FIGS. 10-14 are various views of the vapor cell assembly of the quantum memory device of FIG. 1.
Figure 11:
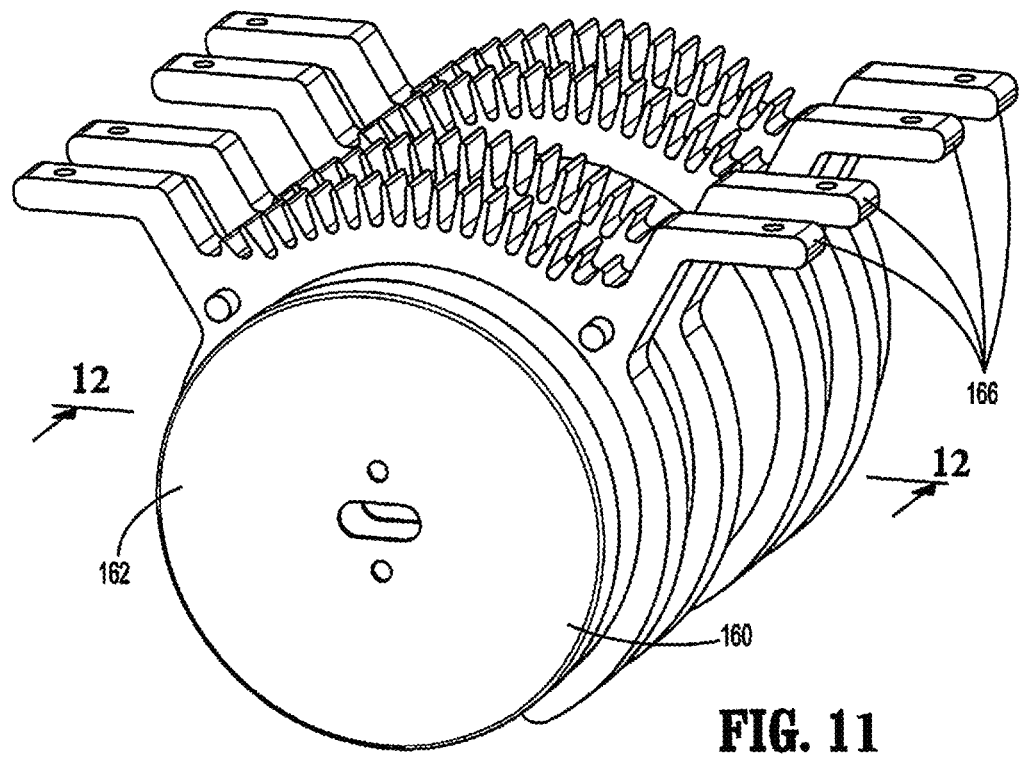
Figure 12:
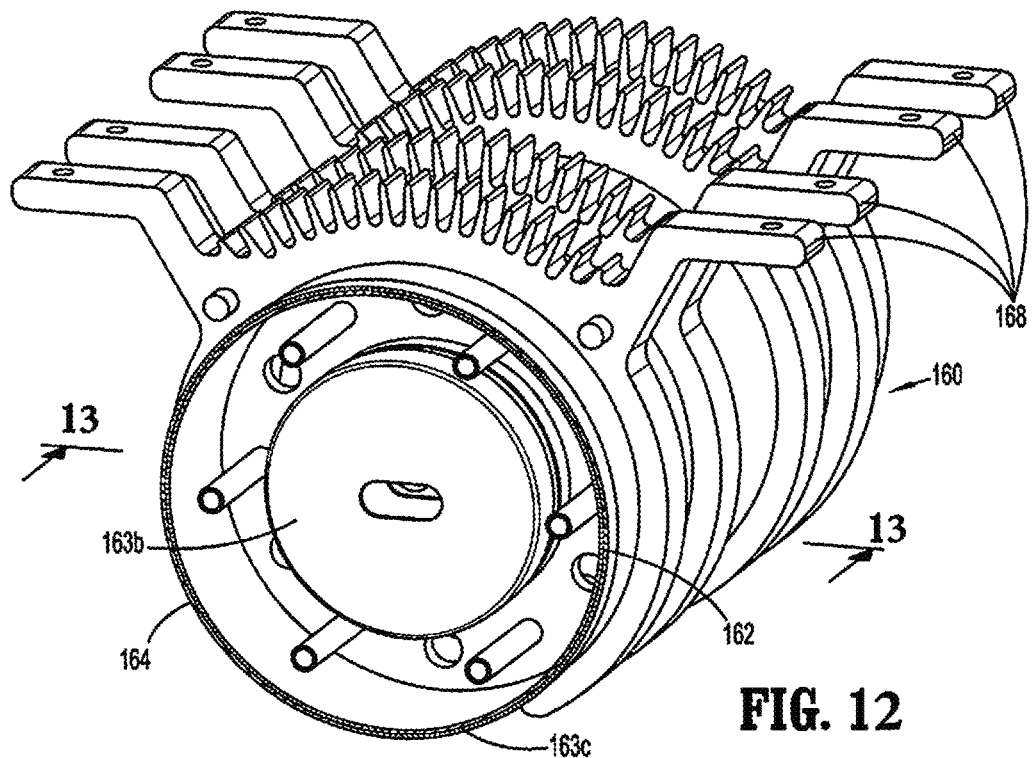
Figure 13:
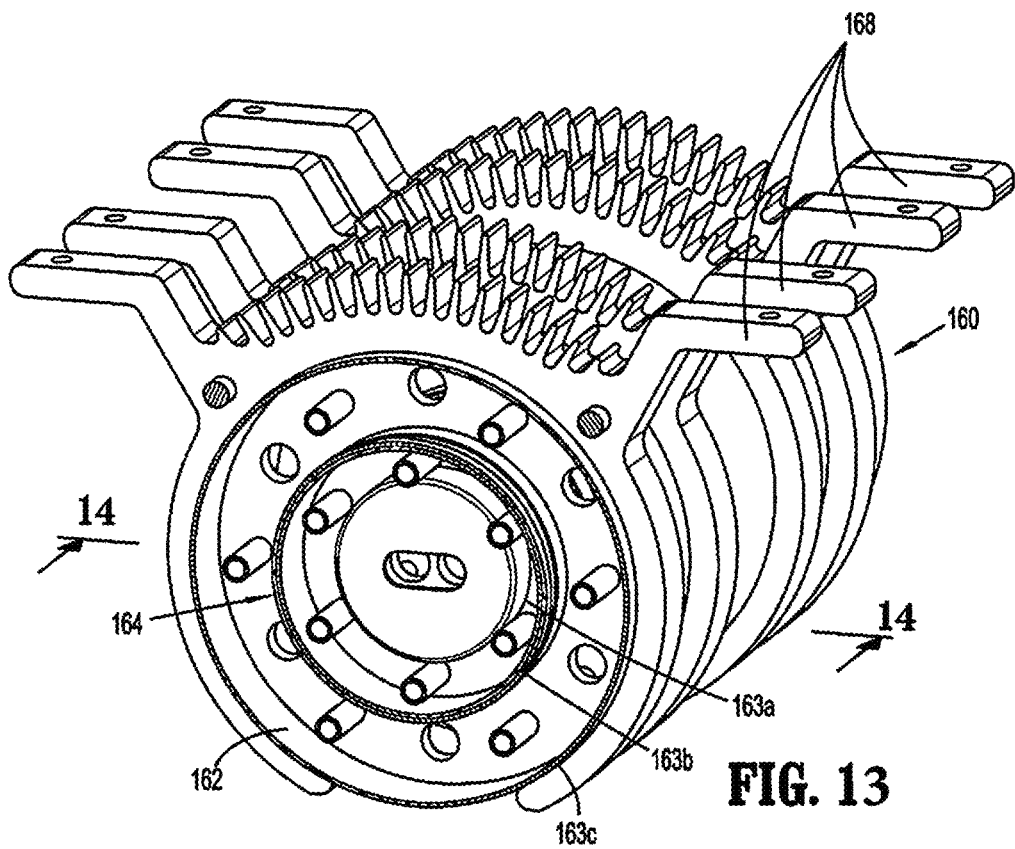
Figure 14:
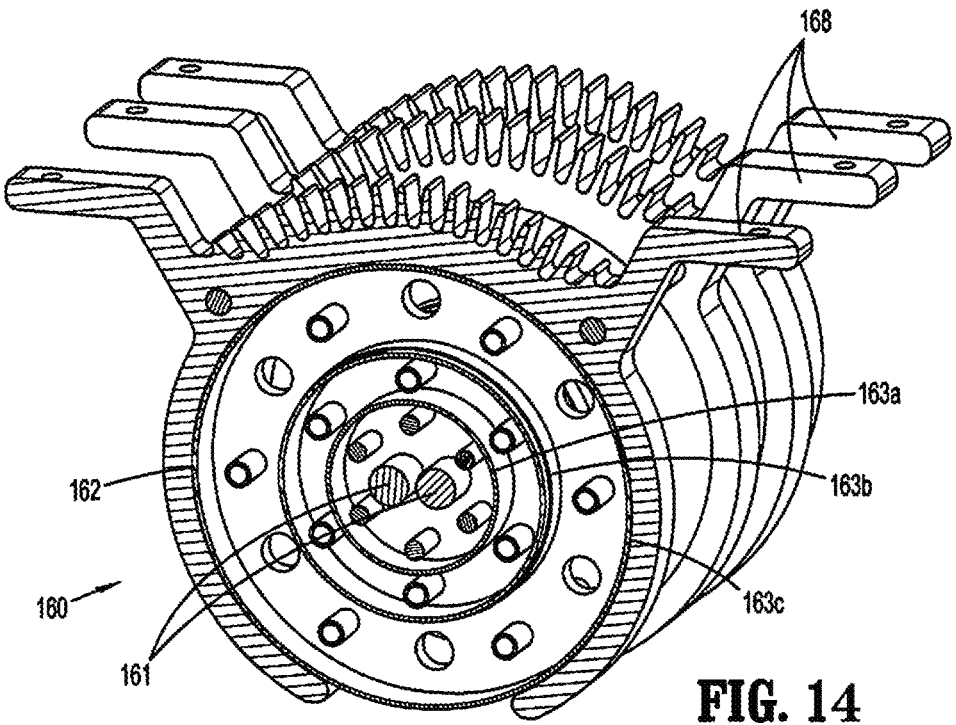
Figure 15:
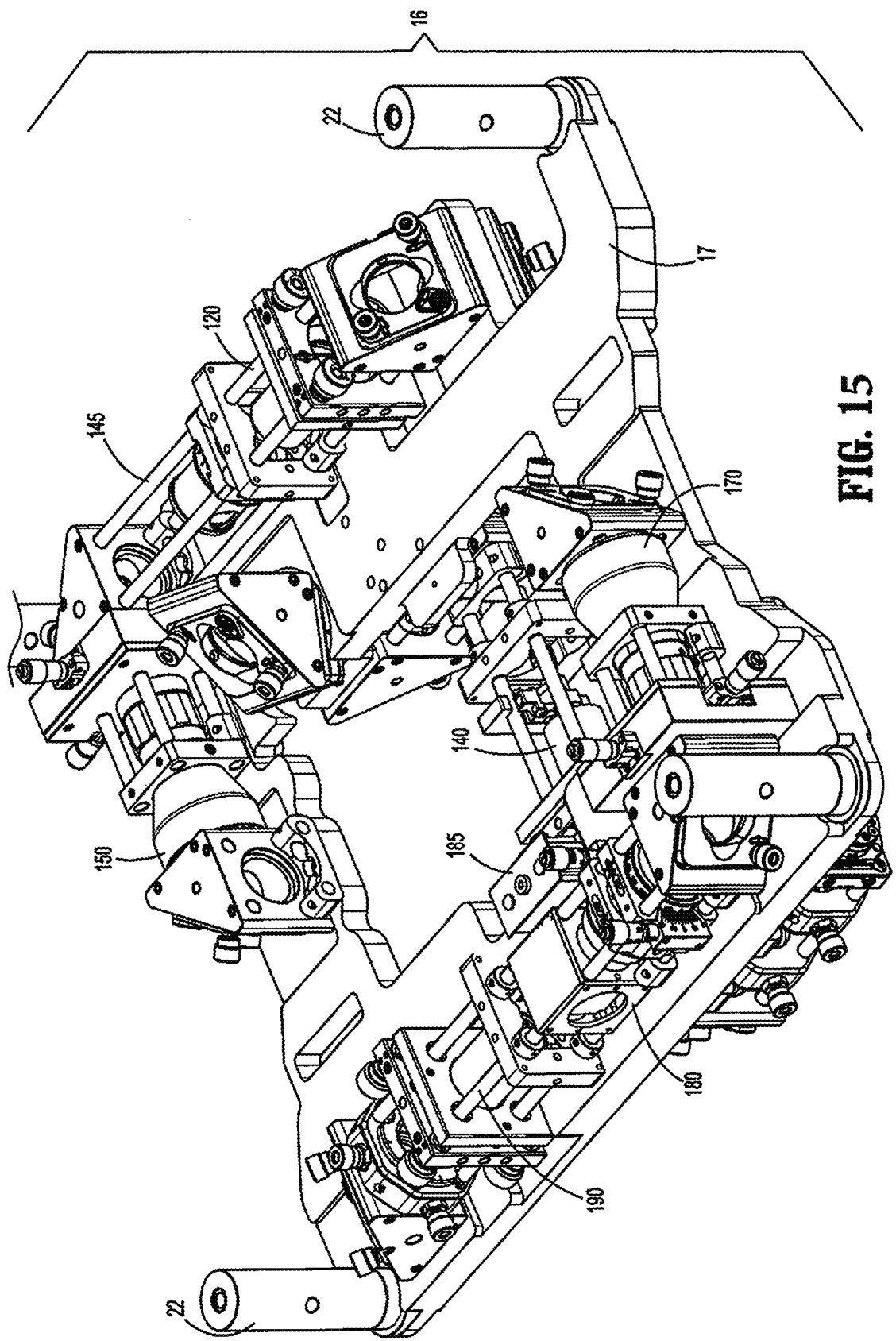
FIGS. 15-18 are top perspective, top plan, bottom plan, and bottom perspective views, respectively, of the first tier of the quantum memory device of FIG. 1.
Figure 16:
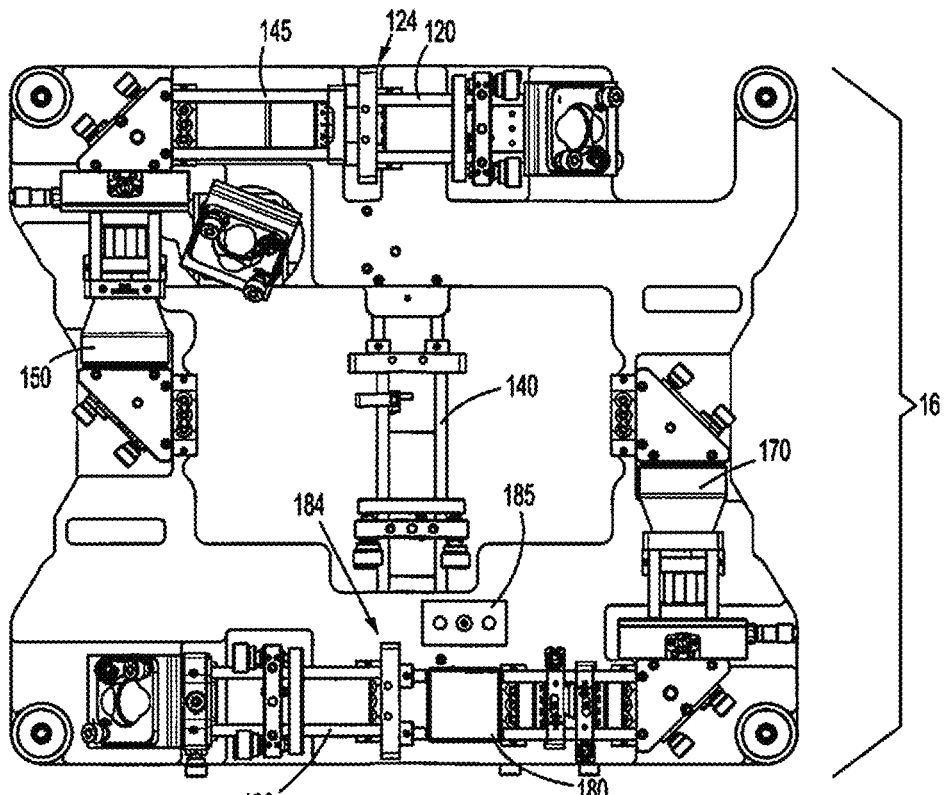
Figure 17:
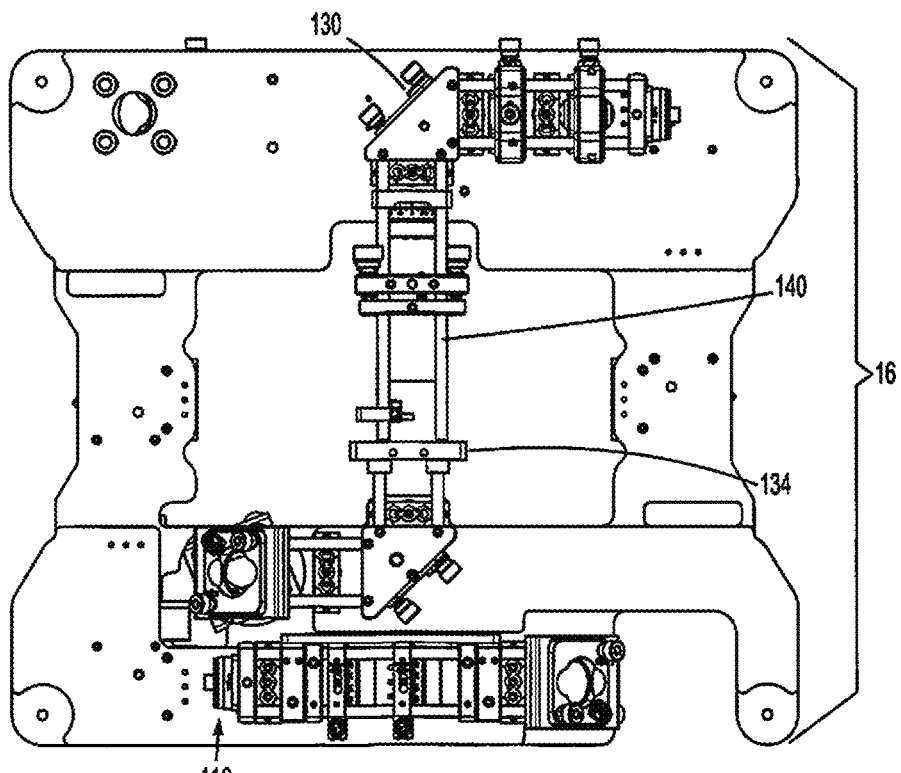
Figure 18:
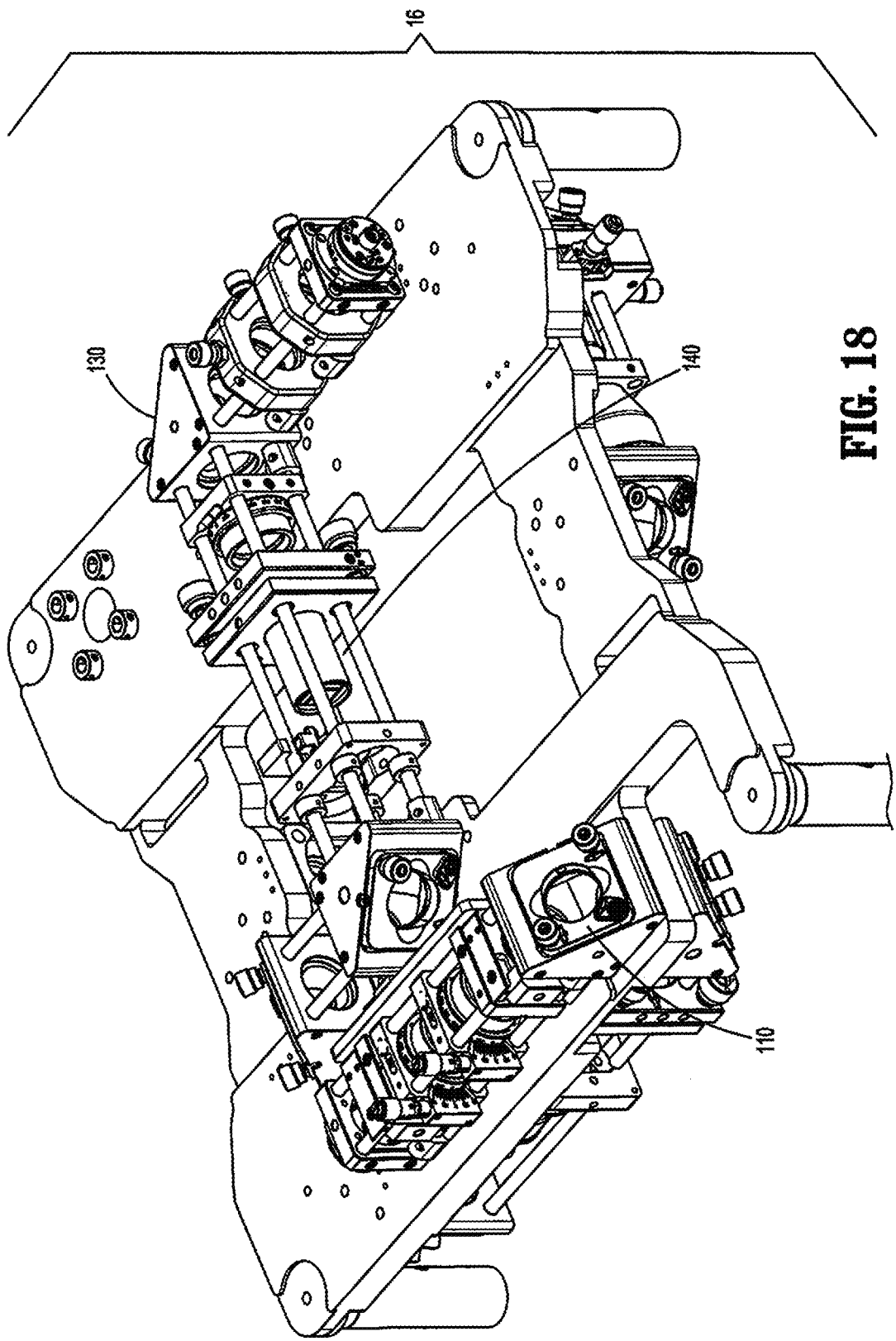

The parallel and independent pairs of photon beams (each formed via the merger of a control-field photon beam and a probe-field photon beam) are directed through the first telescope 150 to match beam-sizes to that of the vapor cells 161 and then to an atomic vapor cell assembly 160. The vapor cell assembly 160 contains two atomic vapor cells 161 (see FIG. 14) containing atoms of a radioactive isotope, such as Rubidium (Rb), particularly the isotope $^{87}$Rb, and a buffer gas, such as Krypton (Kr) and/or Neon (Ne). The control-field photon beams enter the vapor cell assembly 160 to prepare the two vapor cells 161, two independent volumes which serve as the storage mediums for storing the photons of the respective probe-field photon beams and allowing these photons to be stored and retrieved with variable, and controllable, storage times. With momentary additional reference to FIGS. 10-14, vapor cell assembly 160 includes, around it, three layers of concentric magnetic shielding material, for example, Mu shielding 162 (layers 163$a$, 163$b$, 163$c$) to surround and maintain a magnetically neutral medium around vapor cell assembly 160, one or more, e.g., two, heaters 164 (see FIGS. 12 and 14, shown as heating pads), and a Proportional-Integral-Derivative (PID) controller 166 (FIG. 3B) running a PID control loop to control heater(s) 164 to maintain a suitable temperature of the vapor cells 161 of vapor cell assembly 160, e.g., of 55° C. to 70° C. or, in embodiments, 60° C. to about 70° C. A safety circuit (not shown) is also used to prevent overheating. Vapor cell assembly 160 is mounted depending from third board 20 via a plurality of brackets 168 and a plurality of vibration dampeners 169 (FIG. 10). Brackets 168 define a plurality of fins that act as heat sinks to dissipate excess heat away from surrounding optical elements. Centrally positioning vapor cell assembly 160 helps maintain a constant temperature thereof and provides increased shock, misalignment, and damage protection (which is furthered by vibration dampeners 169).

The above-detailed parallel and independent pairs of photon beams provide a dual-rail EIT quantum memory enabling any arbitrary polarization of photons to be mapped onto a quantum superposition of the two spatially-separated and independent "rails." This allows the preservation of the polarization while the individual photons are stored.

On the retrieval side of vapor cell assembly 160, for when the stored photons are desired to be retrieved (which may be on-demand, including storage times of up to 500 μs), quantum memory module 100 includes a second telescope 170 which directs the retrieved photon beams through a plurality of wave plats 164 to a second Glan-Thomson (or other suitable) polarizing beam splitter 180 to filter the control field based on the polarization, e.g., to separate the vertically polarized control field photons from the horizontally polarized probe pulses. A beam dump 185 collects the undesired portion of the retrieved photon beams from second Glan-Thomson polarizing beam splitter 180, while the desired portion of the retrieved photon beams from second Glan-Thomson polarizing beam splitter 180 are directed through a half wave plate 184 to a third beam displacer 190, working in the opposite direction as first and second beam displacers 120, 140, such that third beam displacer 190 combines the pair of the retrieved photon beams into a single retrieved photon beam. The single retrieved photon beam can be extracted for classical light storage, or can be directed to the filtering module 200. Note that, in some embodiments, second telescope 170, second Glan-Thomson polarizing beam splitter 180, beam dump 185, and third beam displacer 190 are characterized as part of the filtering module 200.

Figure 5:
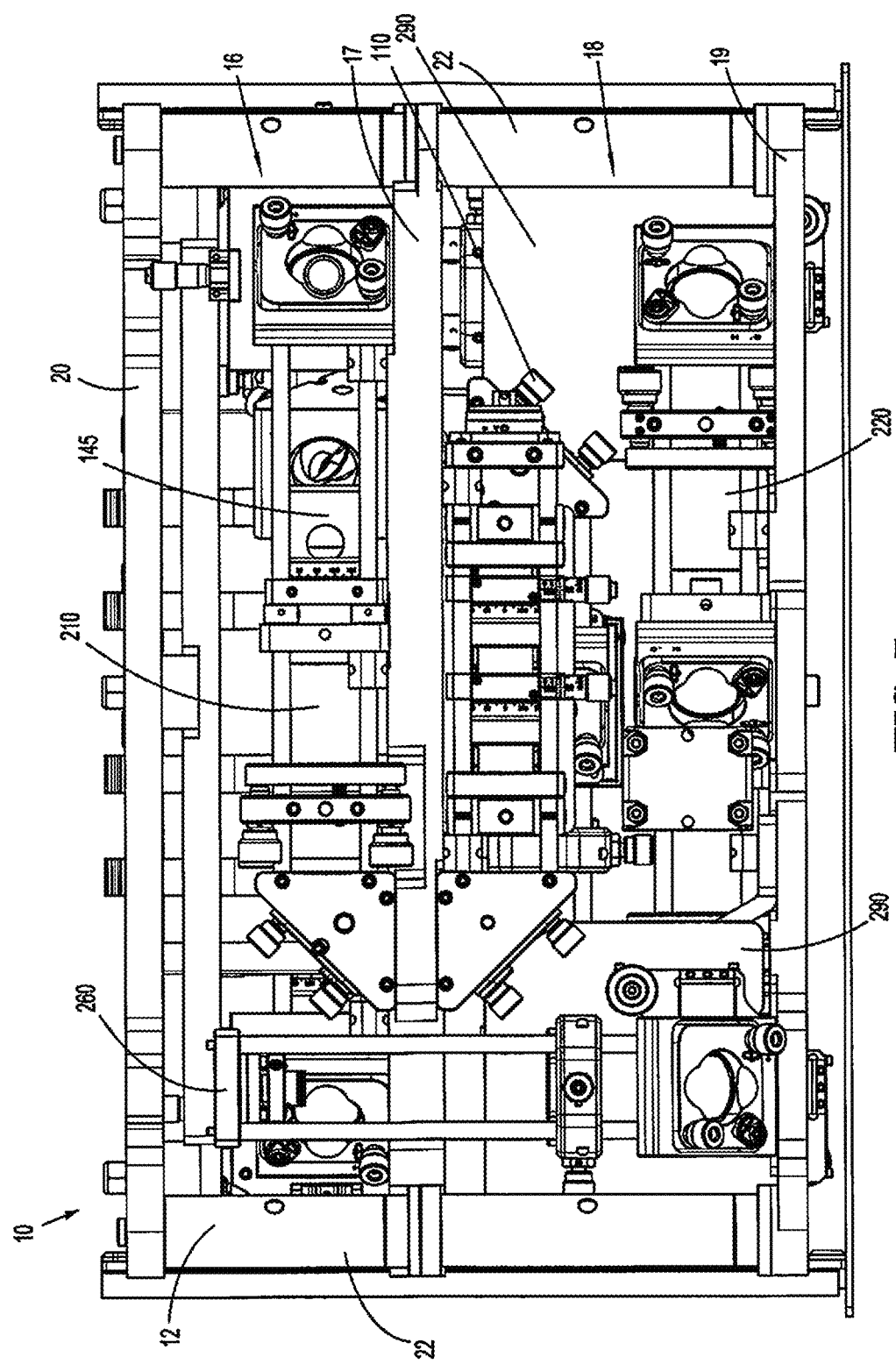
FIG. 5 is a side, cross-sectional view, with the outer shell removed, of the quantum memory device of FIG. 1.
Figure 19:
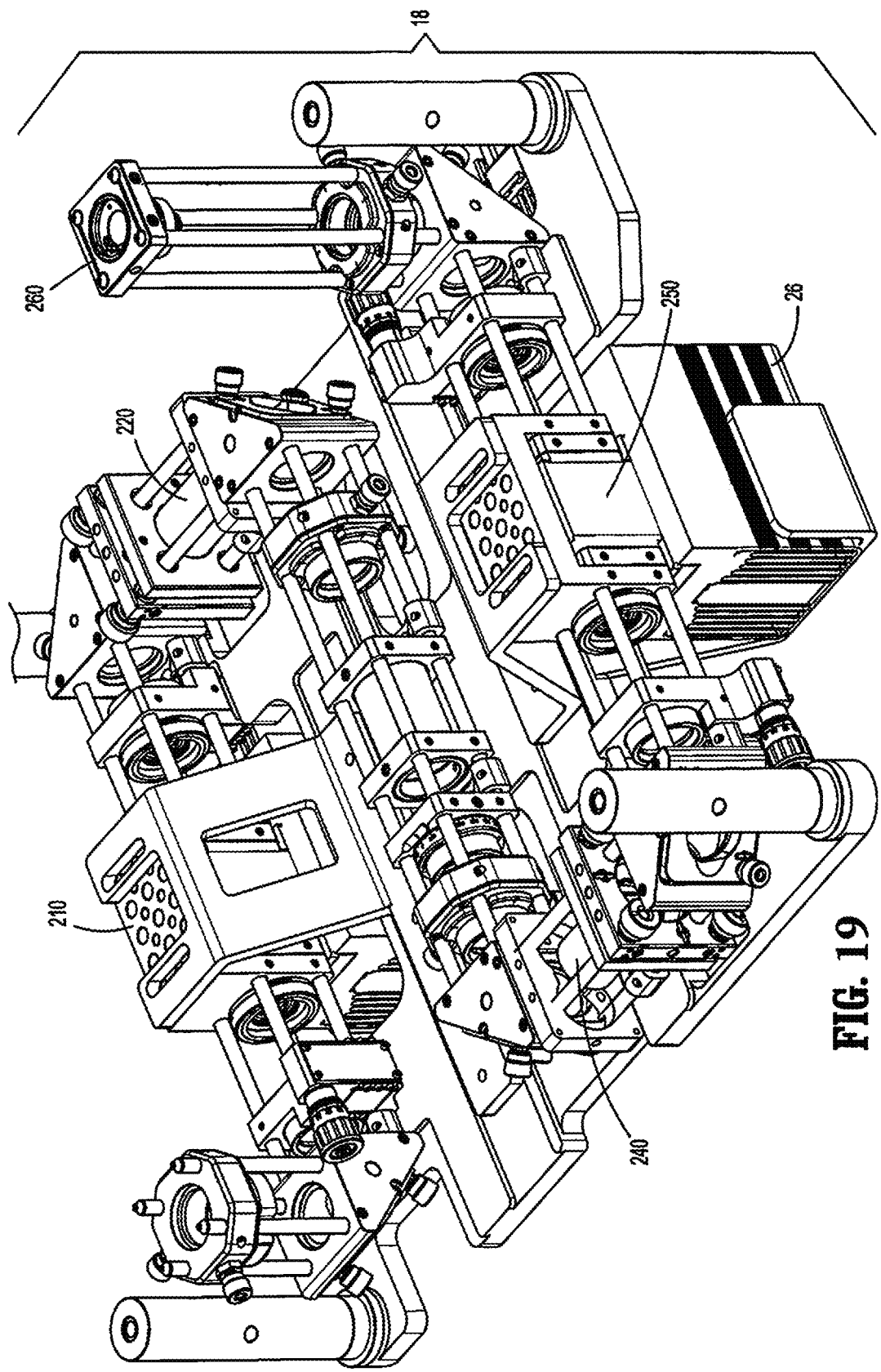
FIGS. 19 and 20 are top perspective and top plan views, respectively, of the second tier of the quantum memory device of FIG. 1.
Figure 20:
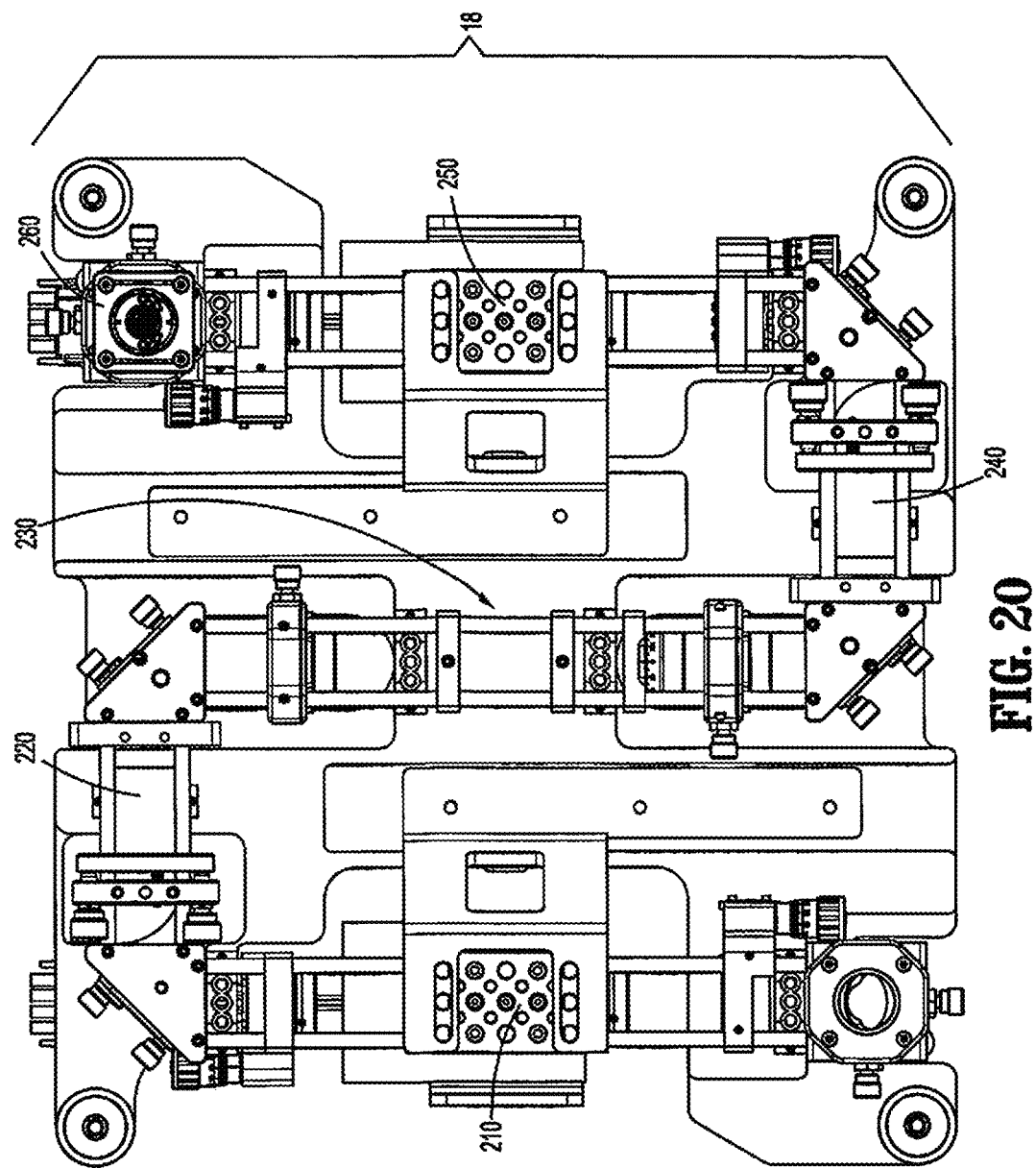
Figure 21:
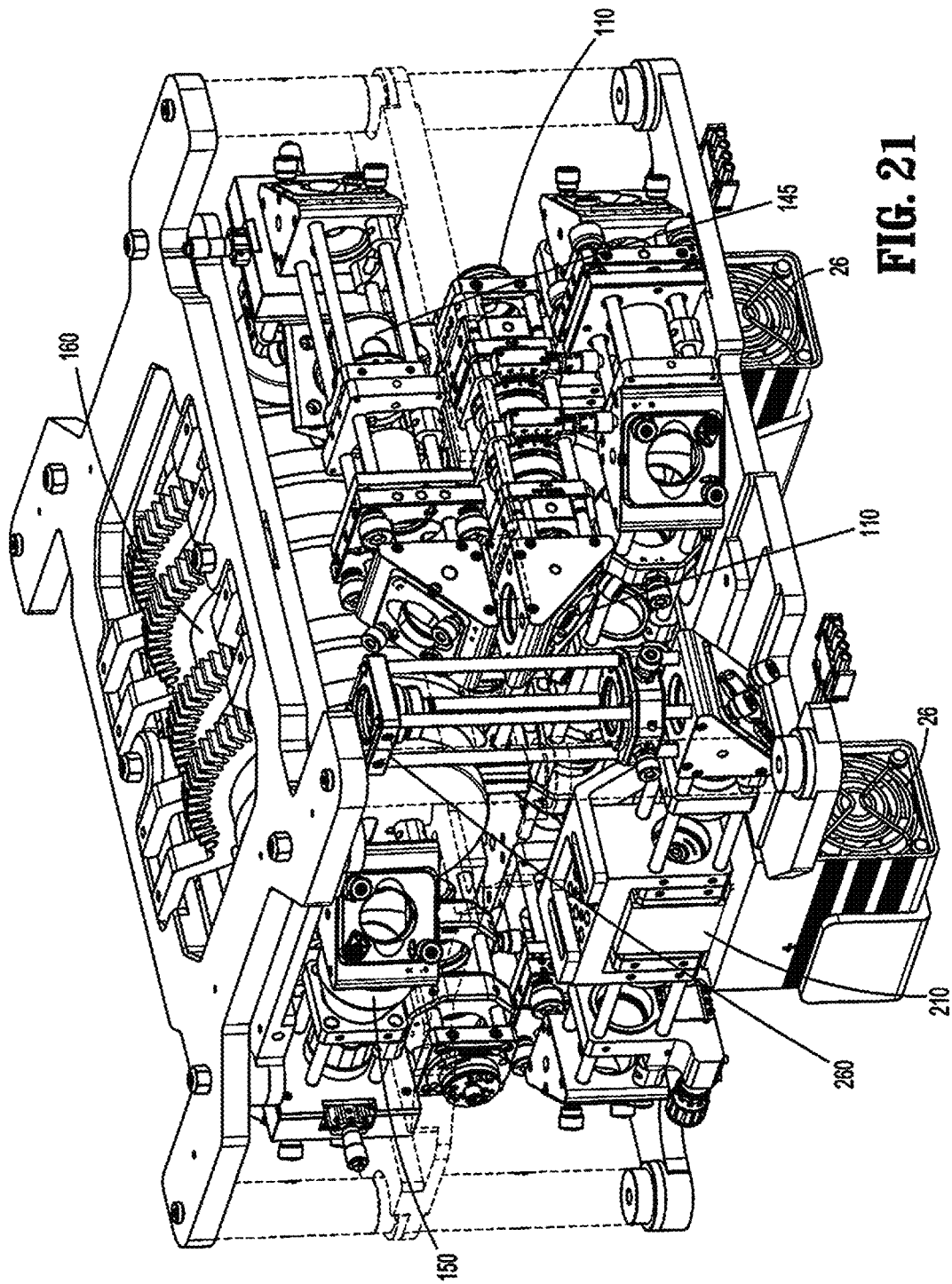
FIG. 21 is a rear perspective views of the of the quantum memory device of FIG. 1 with the outer shell removed and certain supporting structures shown in phantom.

Continuing with reference to FIG. 3B, and with additional reference to FIGS. 19-21, the filtering module 200 receives the retrieved photon beam (which includes both probe photons and the remaining attenuated control portions) and is configured to eliminate the remainder of the control-field photon beam, e.g., the $10^{12}$ unwanted photons of the control field, as well as the noise which is present at ambient temperatures, all without damaging the information-carrying probe-field photon beam. The single retrieved photon beam received from quantum memory module 100 is directed to a first frequency filter (e.g., a PID temperature-controlled ≥50 dB Fabry-Perot cavity, filter, or etalon) 210, then to a fourth beam displacer 220 to split the beam. The split beam is then provided to a polarization maintaining magnetic Faraday isolator filter 230 (ensuring the preservation of information encoded on the photons throughout the filtering module 200 for any arbitrary polarization qubit) and, from there, to a fifth beam displacer 240 in an opposing direction as fourth beam displacer 220 to rejoin the split beam into a single photon beam. The photon beam is then directed to a second frequency filter (e.g., a PID temperature-controlled ≥50 dB Fabry-Perot cavity, filter, or etalon) 250 and, ultimately, through a plurality of wave plates 254 to output 260 of quantum memory device 10. The Fabry-Perot cavities 210, 250 (as well as other temperature-sensitive components of quantum memory device 10), are thermally-isolated from heat-generating components by way of plural thermal barriers 290 (FIG. 5); they are also vibration dampened via the various vibration dampeners, e.g., vibration dampeners 15 (FIG. 4), and the configuration of inner structural frame 14. Further, fans 26 (see FIG. 8) are utilized to draw heat out of the interior of quantum memory device 10 and, more specifically, are positioned to help ensure temperature stabilization of Fabry-Perot cavities 210, 250 (and/or other temperature-sensitive components of quantum memory device 10). Fans 26 may be controlled by the PID controllers of Fabry-Perot cavities 210, 250 to ensure precise temperature control thereof, as noted below.

The filtering module 200 suppresses the control-field photon beam, having demonstrated the ability to provide a total probe-field transmission of 5% for all polarization inputs, exhibiting an effective, control-to-probe suppression ratio of 130 dB, thereby effectively eliminating the control-field photon beam. Further, ~50 dB of control field extinction is achieved. Fine tuning of the transmission frequency is accomplished by controlling the temperatures of the passive frequency filters 210, 250 (which may have free spectral ranges (FSRs) of 210-220 GHz to minimize the transmission of the control field, which is phase-locked at an offset 6.834 GHz from the probe field) using the independent PID controllers with a precision of equal to or less than 0.1K.

The filtering module 200 and the quantum memory module 100 also reshape noise, of which the leading source for EIT-based quantum memory devices comes from spontaneous four-wave mixing, which induces unwanted gain on the probe wavelength. The filtering module 200 and the quantum memory module 100, more specifically, cooperate to effect noise reduction by introducing an auxiliary optical field that destructively interferes with the Stokes field generated by four-wave mixing within the $^{87}$RB vapor cells of vapor cell assembly 160, thereby creating a substantial signal-to-background ratio after the frequency filtering. This noise reduction enables fidelities greater than 98%. However, other suitable noise filtering schemes are also contemplated. A safety circuit (not explicitly shown) is also provided to prevent under-cooling of the etalons 210, 250 to avoid reaching the dew point, preventing condensation on their surfaces.

Turning now to FIGS. 3C-5 and 8-21, quantum memory device 10 is embodied as a robust, ambient-temperature operating device configured for use outside the laboratory as part of a quantum network including plural of such devices and/or other suitable quantum networking components. For the purposes herein, "portable" refers to a device that is capable of being lifted, transported, and deployed in the field (e.g., rack-mounted) without significant ancillary equipment or infrastructure—as opposed to laboratory operating quantum memories which reside on optical tables. The portability aspect, combined with ambient-temperature operation, promotes scalability contrarily to alternatives, which require cryogenic cooling, laser cooling, and/or vacuum systems.

Quantum memory device 10 includes various sub-assemblies supporting the various components of quantum memory module 100, filtering module 200, and the other functional components (e.g., controllers, power sources, sensors, storage devices, etc.) associated with modules 100, 200. These sub-assemblies are disposed within shell 12 and supported by inner structural frame 14 in a manner that provides robustness, optical stability, long-term operation, and that promotes modularization. More specifically, the quantum memory device 10 includes a first, upper tier 16 having the various components of quantum memory module 100 and a second, lower tier 18 having the various components of filtering module 200. A first mechanical mounting layer or board 17 forming the first tier 16 includes the components of the quantum memory module 100 mounted thereon and depending therefrom, with vapor cell assembly 160 seated within a central opening defined through first board 17 (FIG. 2). A second mechanical mounting layer or board 19 forming the second tier 18 includes the components of filtering module 200 mounted thereon. A third mechanical mounting layer or board 20 serves as a top of the inner structural frame 14 and mounts atomic vapor cell assembly 160 thereon with atomic vapor cell assembly 160 depending therefrom. With third board 20 positioned in this manner, the components of the quantum memory module 100 and filtering module 200 are disposed between second and third boards 19, 20, respectively, with first board 17 generally centrally disposed relative thereto. Corner pillars 22 are provided to provide structural support and maintain proper spacing between the board 17, 19, 20 and, thus, the components of quantum memory module 100 and filtering module 200.

Figure 8:
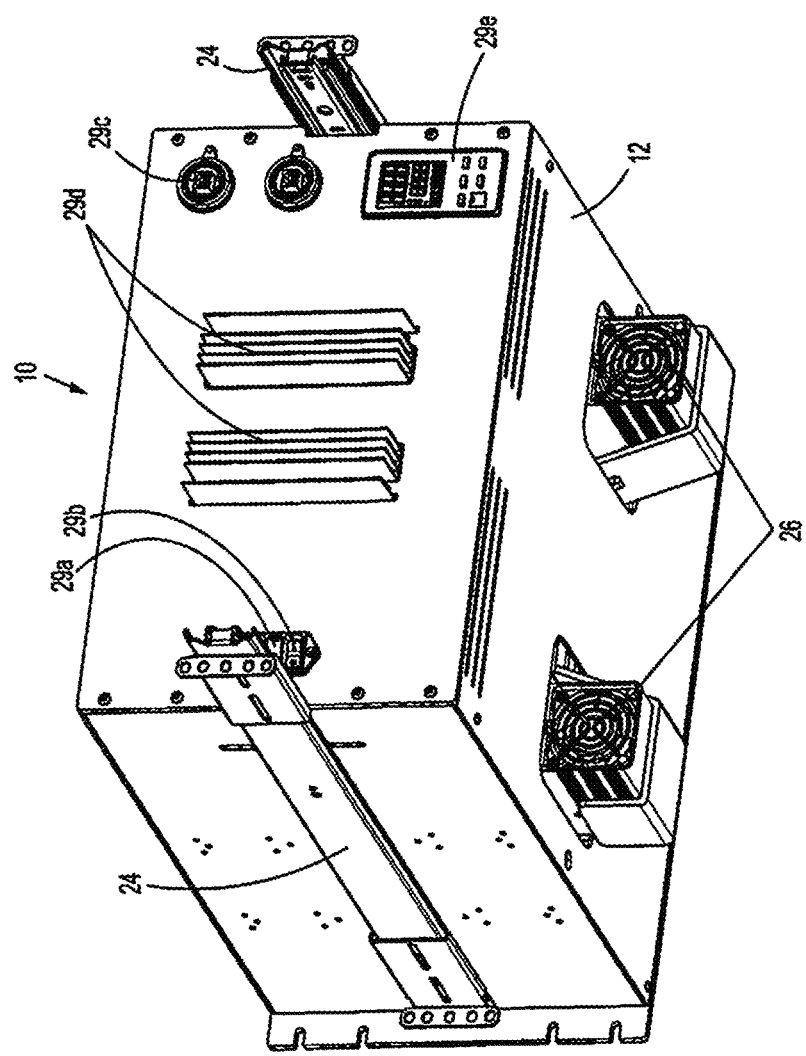
FIG. 8 is a rear, bottom, perspective view of the quantum memory device of FIG. 1.
Figure 9:
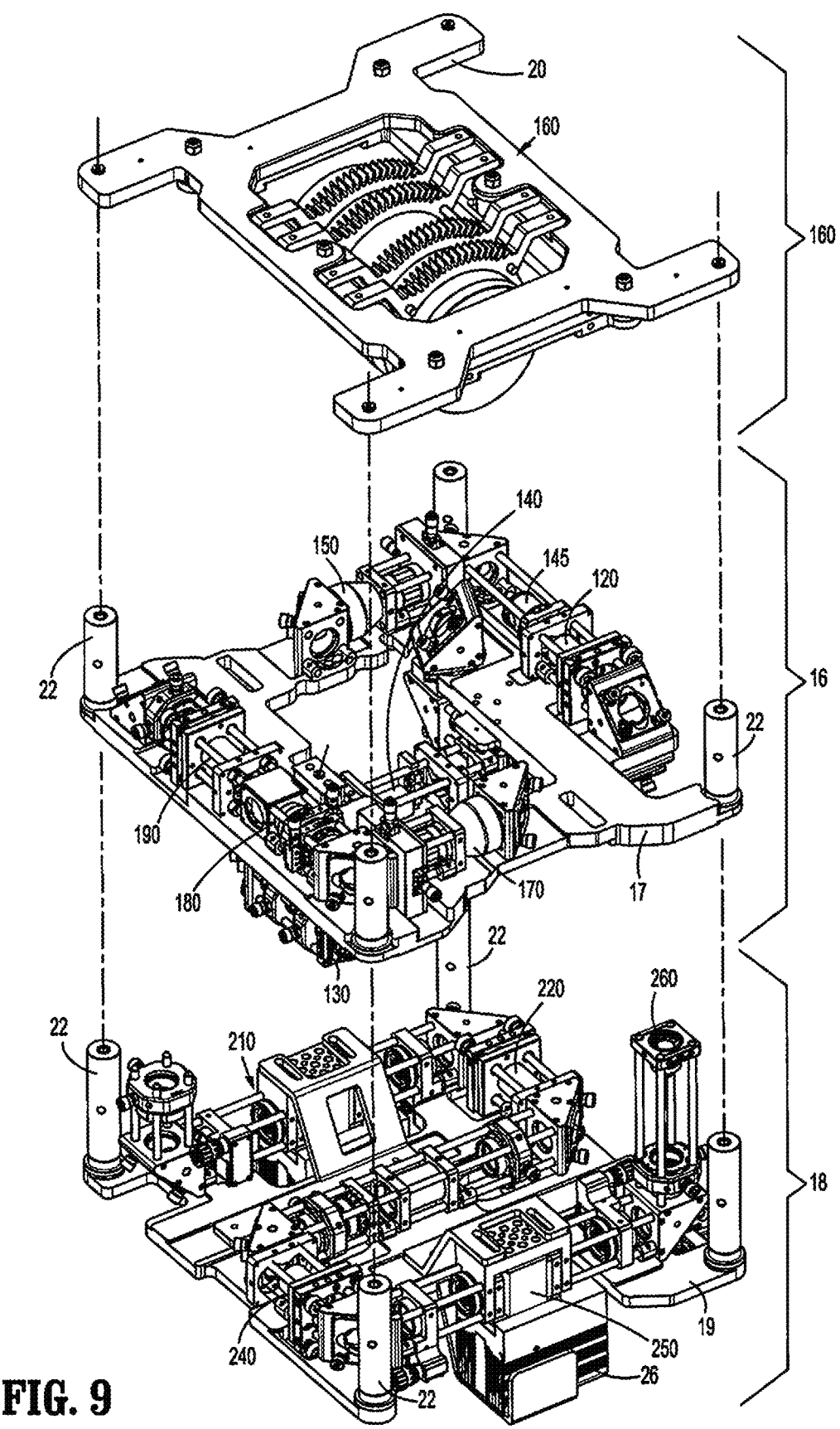
FIG. 9 is an exploded, perspective view of the internal components of the quantum memory device of FIG. 1.

Referring in particular to FIGS. 4 and 8, shell 12 may include slide brackets 24 disposed on opposite sides thereof to enable quantum memory device 10 to be rack mounted, e.g., quantum memory device 10 may be sized for use with a standard 19-inch rack, although other configurations are also contemplated. As shown in FIGS. 8, 19, and 21, fans 26 may be mounted to depend from shell 12; fans 26, as appreciated, facilitate cooling of the electronic components of quantum memory device 10 and exhaust externally of the interior of shell 12. In embodiments, fans 26 are positioned adjacent, e.g., depending below, Fabry-Perot cavities 210, 250 to maintain stable temperatures thereof, as noted above (see FIGS. 8 and 9). Continuing with reference to FIG. 8, the rear (or one or more other portions) of quantum memory device 10 further includes an AC power receptacle 29a, an ON/OFF power button 29b, one or more USB or other suitable ports 29c for monitoring, tuning, and/or controlling quantum memory device 10, a plurality of heat sink fins 29d configured to help dissipate heat, e.g., from the power source, and a temperature control panel 29e configured to enable external monitoring and/or control of the temperature of vapor cells 161 of vapor cell assembly 160 (see FIGS. 10-14).

Figure 6:
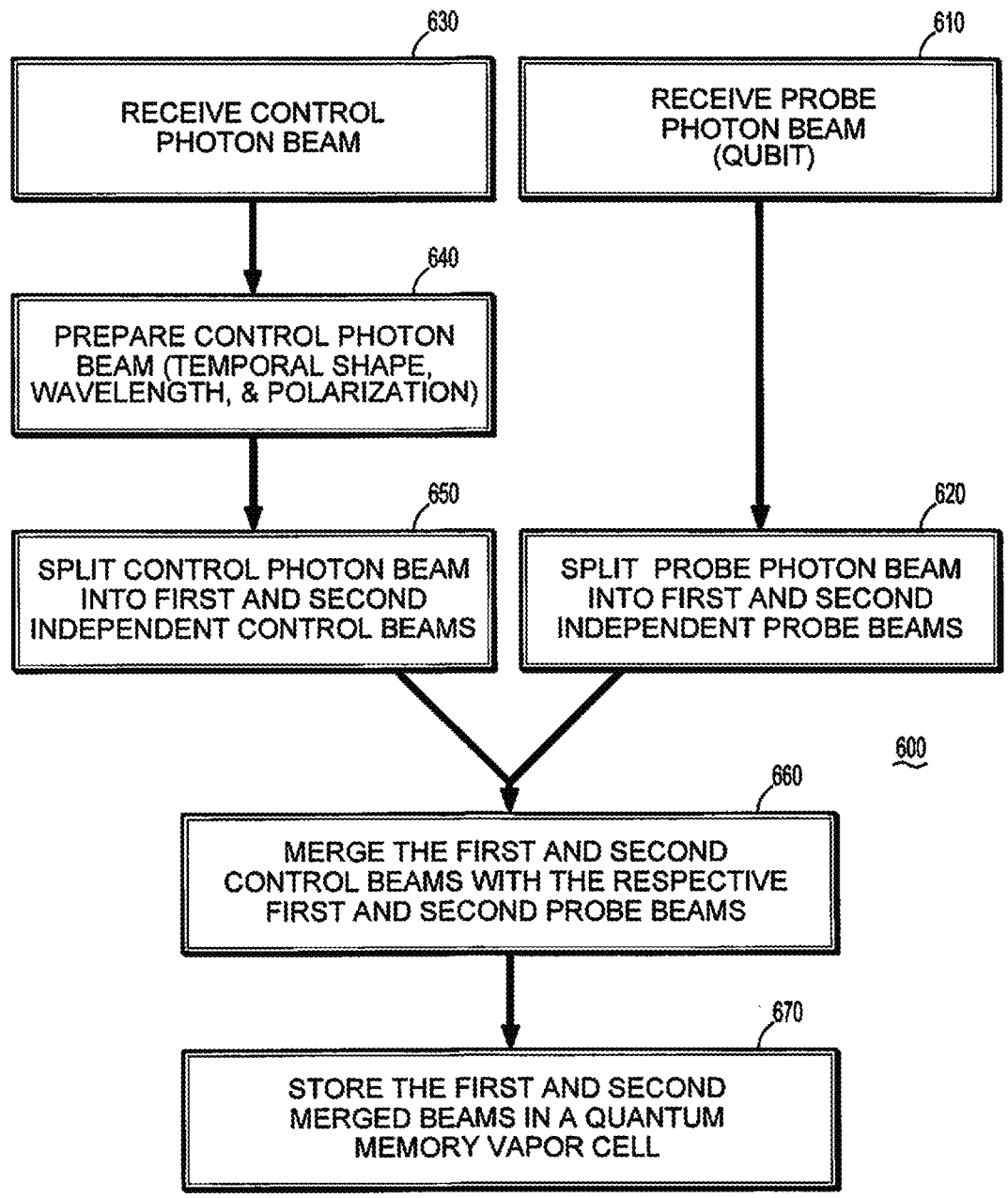
FIG. 6 is a flow diagram illustrating a first (preparation & storage) portion of a method of the present disclosure.

With reference to FIG. 6, a method 600 facilitating ambient-temperature quantum communication such as, for example, using quantum memory device 10 (FIG. 1) or any other suitable quantum memory device is detailed. Method 600 includes, at 610, receiving a probe-field photon beam (qubit) and, at 620, splitting the probe-field photon beam into first and second independent (and orthogonally polarized and parallel) probe beams. At the same time or in close temporal relation, a control-field photon beam is received at 630, prepared at 640, e.g., for temporal shape, wavelength, and polarization, and split at 650 similar as with the probe-field photon beam. At 660, the first and second control beams are merged with the respective first and second probe beams to provide two independent, merged beams (each having a control beam component and a probe beam component). The independent, merged beams are then directed to a quantum memory vapor cell for storage therein, as indicated at 670. The above-detailed method enables selective retrieval of the independent, merged beams, as detailed below.

Figure 7:
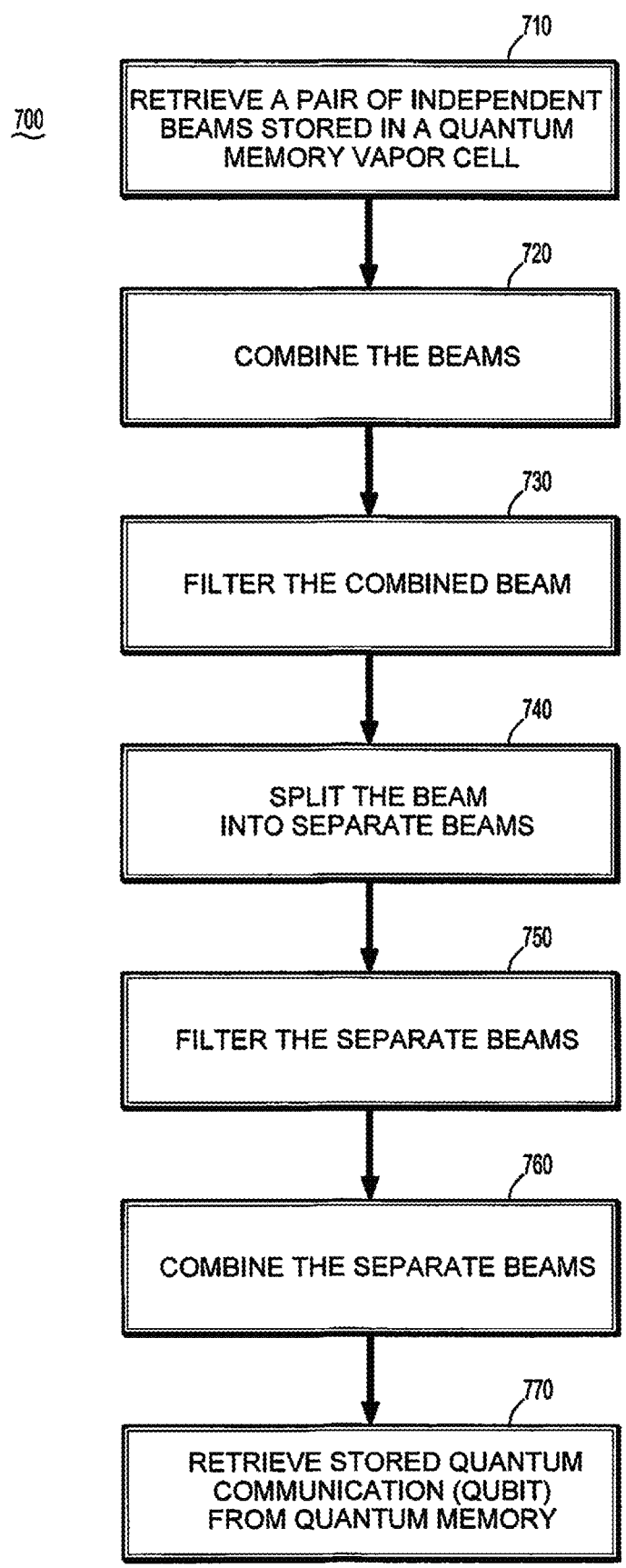
FIG. 7 is a flow diagram illustrating a second (filtering & retrieval) portion of a method of the present disclosure.

Turning to FIG. 7, method 700 is provided to retrieve and output the stored quantum communication. In method 700, independent beams stored in the quantum memory's vapor cell are retrieved at 710 (where these two beams are merged; both beams have a control-field component and a probe-field component). The two independent beams are combined at 720, filtered at 730, split at 740, filtered again at 750, and re-combined at 760. Finally, at 770, the stored quantum communication (qubit) is retrieved from the quantum memory. This process eliminates noise from the control-field beam without damaging the probe-field photon beam, and the quantum information it carries. Ultimately, once filtered as noted above, the resultant photon beam is output for transmission to another device, component, or system.

Qubit Preparation

Figure 22:
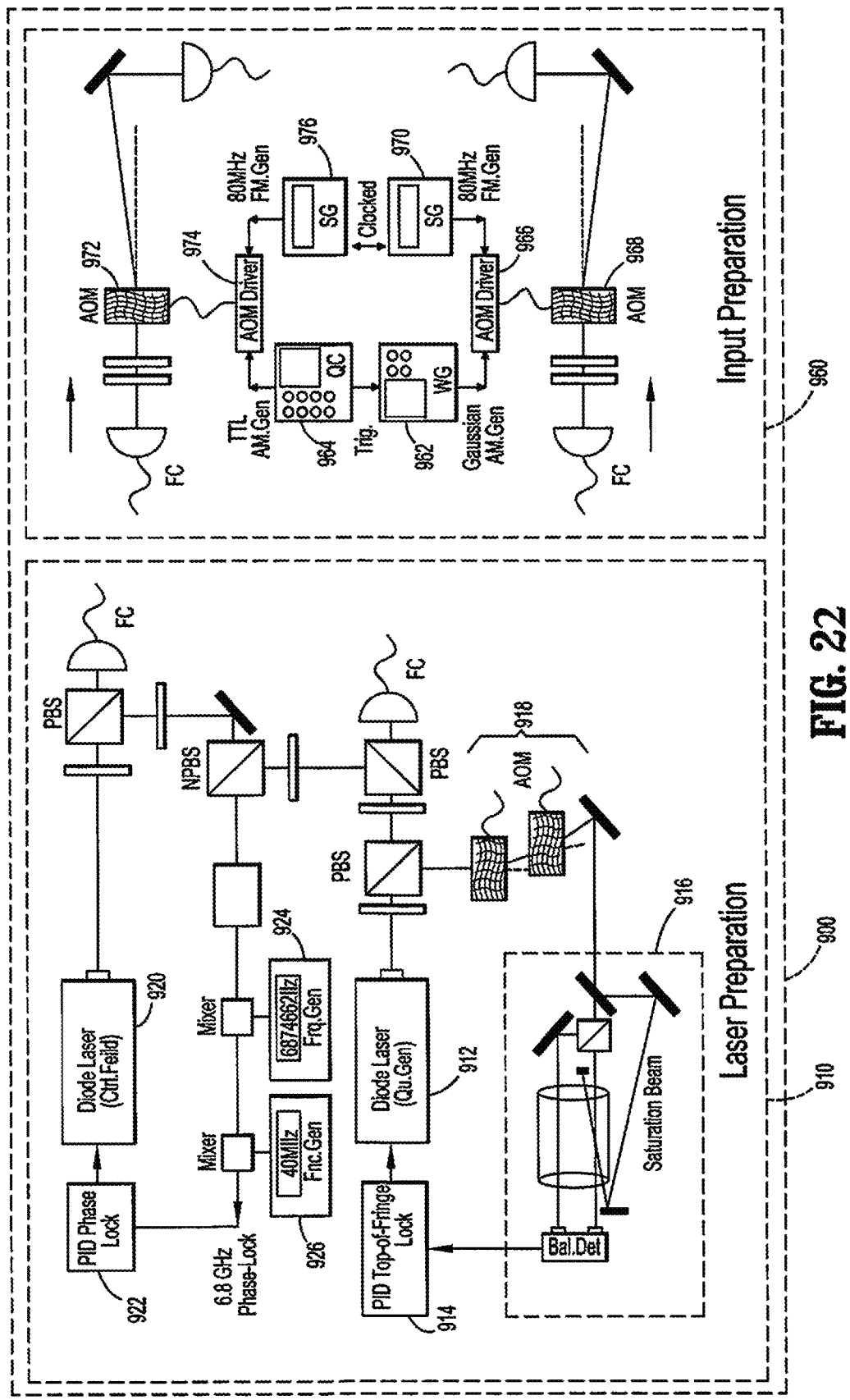
FIG. 22 is a schematic diagram of device(s) for generating the probe-field photons and a control-field photon beam for the quantum memory device of FIG. 1.

Referring to FIG. 22, an exemplary device for generating the probe-field photon beam and control-field photon beam for input to memory 10 (FIG. 1) is shown generally identified by reference numeral 900 including a laser preparation module 910 and an input preparation module 960. The laser preparation module 910 includes a first diode laser 912 used for generating the probe-field photon beam which is controlled using a PID lock 914 and a compact saturation spectroscopy (Doppler free spectroscopy) system 916, e.g., a Toptica CoSy system, available from Toptica Photonics, Inc. of Farmington, N.Y., USA. An acousto-optic modulator (AOM) 918 is positioned before the locking beam enters the system 916.

The control-field photon beam, generated by a second diode laser 920, is locked to transmit light at a specific frequency, e.g., 6.8348 GHz, away from the probe-field photon beam using a PID phase lock 922 and mixing with signals from a frequency generator 924 and a function generator 926.

Having been generated as detailed above, the probe-field photon beam and the control-field photon beam are transmitted from the laser preparation module 910 to the input preparation module 960 to be shaped before entering the memory 10 (FIG. 1). An FPGA-controlled DAC (or Arbitrary Wave Generator) 962, controlled by a master trigger (QC) 964, sets the repetition rate of the probe-field photon beam and generates one FWHM Gaussian envelope per trigger. This pulse is then sent to an AOM driver 966 as the Amplitude Modulation (AM) input to an AOM 968 while a frequency modulation (FM) input provided by a Signal Generator (SG) 970 is also provided to the AOM 968 to shape the probe-field photon beam. The control-field photon beam is likewise shaped via an AOM 972 driven by an AOM drive 974 that receives an AM input from QC 964 and an FM input from an SG 976 that is closed to SG 970. These beams are then transmitted to the memory 10 (FIG. 1). The probe photons are heavily attenuated such that they average to n=1. Alternatively, a genuine single photon source could be used.

Quantum Network

Figure 23:
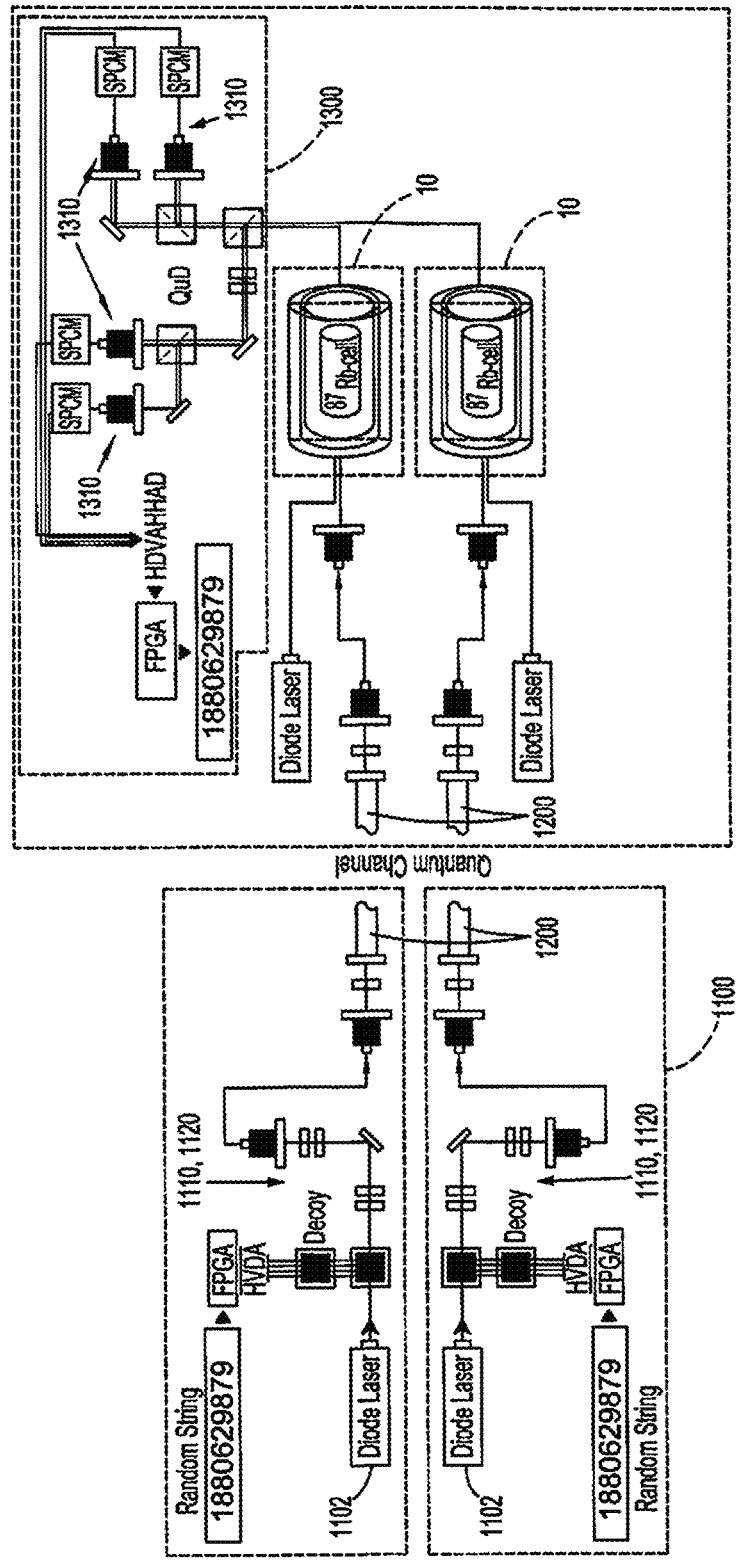
FIG. 23 is a simplified, schematic diagram of an exemplary quantum network provided in accordance with the present disclosure.
Figure 24:
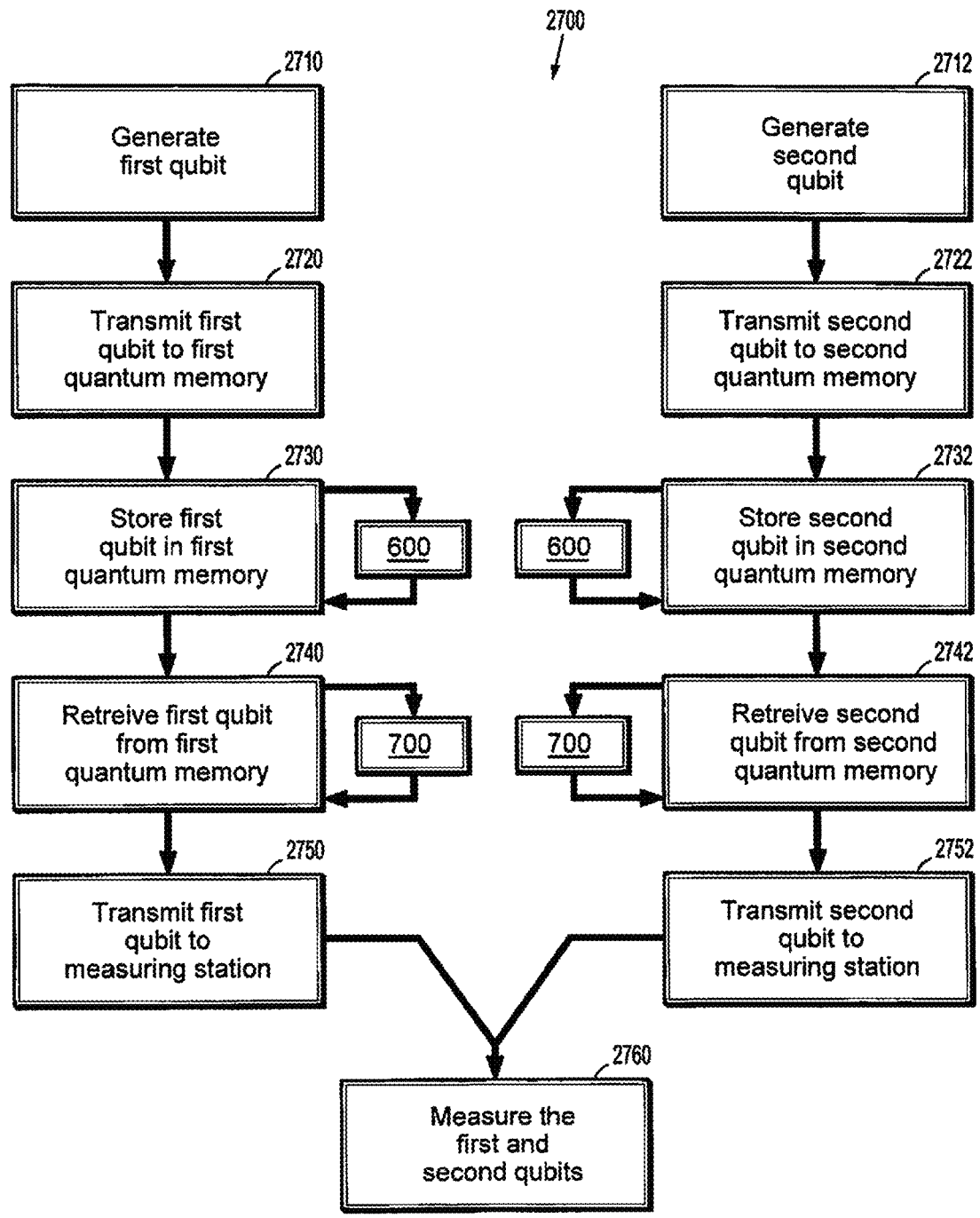
FIG. 24 is a flow diagram illustrating a method of a quantum network of the present disclosure.

Turning to FIGS. 23 and 24, a quantum network requires several quantum nodes, capable of coherently manipulating the quantum information with fidelity near unity such that the output of each node is indistinguishable from the input provided thereto. These nodes may include, for example, one or more quantum memories, quantum simulators, random number generators, entanglement sources, and/or photon gates.

One example of such a quantum network and method leverages room-temperature quantum memories, e.g., a plurality of memories 10, to provide a multi-node memory-assisted quantum network using polarization qubits. A basic configuration of such a network, designated generally as network 1000, includes two polarization qubit sources 1100, two room-temperature quantum memories 10 (as detailed above) each connected to a respective one of the polarization qubit sources 1100 via a connection 1200, e.g., a fiber-optic cable or other suitable connection (including free space connections), and one Bell-state measurement station 1300 employing four single-photon detectors 1310. Hong-Ou-Mandel (HOM) interference experiments have verified identical storage and retrieval from the two room-temperature quantum memories 10 of this network 1000, e.g., that both the temporal envelope, optical frequency, and polarization of the retrieved photons remain the same after storage.

The polarization qubit sources 1100, more specifically, include independent laser diodes 1102 and utilize acousto-optical and electro-optical modulators 1110, 1120, respectively, to generate random streams of polarization qubits at steps 2710, 2712 of method 2700. More specifically, the diodes 1102 generate beams and independent acoustic-optical modulators (AOMs) 1110 that temporally shape the probe fields. The AOMs 1100 are driven by two phase-locked signal generators. Two DACs (or Arbitrary Wave Generators) modulate the amplitude of the AOMs 1110. These DACs (or Arbitrary Wave Generators) are triggered by the master trigger FPGA to generate the FWHM Gaussian envelope of the probe pulses. Independent Electro-Optical Modulation units (EOM) 1120 are in place to encode the desired polarization states on the probe pulses. The output polarization is modulated based on the input applied voltage to the EOMs 1120. An FPGA-based circuit controls the high-voltage amplifiers for fast operation and trigger-synchronized control. The FPGA can be programmed to generate any sequence of polarizations including a fully (quantum) random sequence. Both probe-field beams and control-field beams are delivered from the polarization qubit sources 1100 to the respective memories 10 via connections 1200, e.g., single-mode optical fibers, as indicated at steps 2720, 2722 of method 2700.

The beams travel through the connections 1200 to the memories 10 where, as detailed above, the qubits are stored on a pair of independent dual-rails for each memory 10, as indicated at steps 2730, 2732 of method 2700. More specifically, the qubits are stored according to method 600 (FIG. 6). After storage, the qubits are retrieved, as indicated at steps 2740, 2742 of method 2700, e.g., according to method 700 (FIG. 7), temporal wave-function matching is performed, and the retrieved qubits are sent to Bell-state measuring station 1300, as indicated at steps 2750, 2752 of method 2700. Bell-state measuring station 1300 projects the incoming retrieved qubits into a Bell-state, as indicated at step 2760 of method 2700. More specifically, a series of waveplates are used to compensate for polarization rotation caused by propagation in the optical fibers. The pulses retrieved from the memories 10 are interfered at a 50:50 beam splitter, and two single-photon detectors (SPCMs) placed at the output arms of the beam splitter generate a signal every time they record a hit. Data from the SPCMs is analyzed to calculate the coincidence rate between opposite output arms of the NPBS.

The quantum networks of the present disclosure may further include a software-defined infrastructure to monitor and control the devices of the quantum network to ensure high efficiency, control, and longevity. In particular, the memories 10 (FIG. 1), which include feedback systems for optical filtering, temperature monitoring for the Rb cells, power monitoring, and other parameters, can be controlled over the network. Additionally, for self-turning purposes and network performance analysis, machine learning or other artificial intelligence protocols may be implemented to optimize operating parameters.

Figure 25:
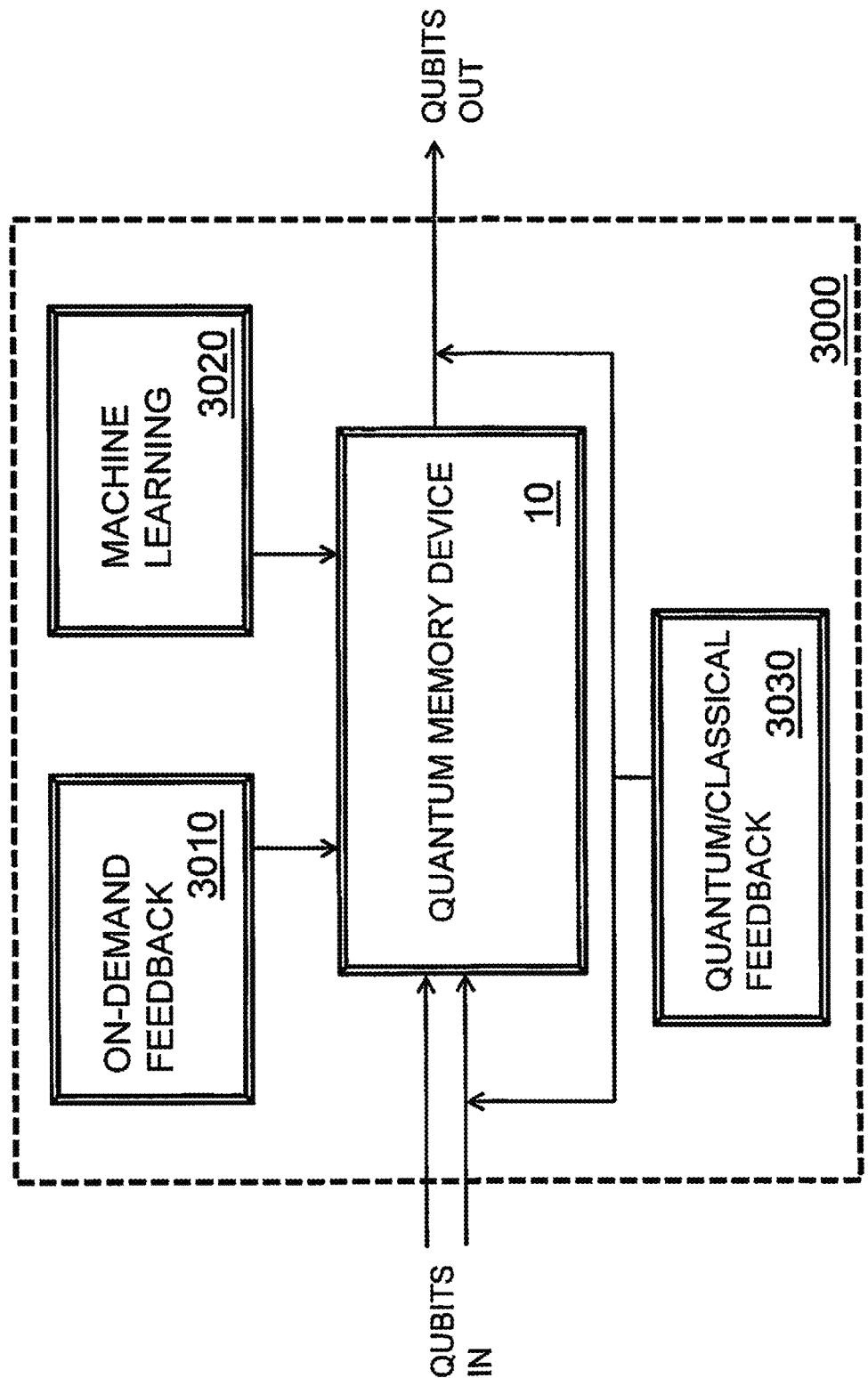
FIG. 25 is a block diagram illustrating a control system configured for use with the quantum memory device of FIG. 1.

More specifically, with reference to FIG. 25, an embodiment of a control system 3000 configured to remotely control optimization and operation of quantum memory device 10 is shown. Although illustrated with respect to one quantum memory device 10, it is contemplated that control system 3000 may enable remote control optimization and operation of a plurality of quantum memory devices 10 (and/or other quantum devices) across one or more quantum networks. Control system 3000 includes a plurality of sub-systems: on-demand feedback sub-system 3010, machine learning sub-system 3020, and quantum/classical feedback sub-system 3030. Portions of control system 3000 may be implemented using FPGA devices for fast feedback control and hybrid quantum/classical controls for system stabilization (e.g., polarization in the transmission fibers) and automation (e.g., noise removal at single-photon levels).

On-demand feedback sub-system 3010 of control system 3000 includes control of: the PID controllers and fans 26 (FIGS. 8 and 9) associated with filter cavities 210, 250 (see FIG. 3B) to stabilize the temperatures of cavities 210, 250; the PID controller 166 and heaters 164 for controlling the temperature of the vapor cell assembly 160 (see FIG. 3B); mode-matching feedback; automatic alignment optimization of the optical components; and overall system status monitoring (including, for example, intrusion detection, protection shutters for side-channel attacks, implementing decoy states, etc.).

Machine learning sub-system 3020 optimizes pulse shaping and timing (spatial and temporal tuning of pulse parameters), and noise cancelling (implementing an ultra-low noise single photon storage regime). Machine learning sub-system 3020 may implement one or more of: supervised learning, semi-supervised learning, unsupervised learning, reinforcement learning, association rule learning, decision tree learning, anomaly detection, feature learning, etc., and may be modeled as one or more of a neural network, Bayesian network, support vector machine, genetic algorithm, etc.

Quantum/classical feedback sub-system 3030 provides: automated, near-real time polarization and power measurements and stabilization; noise cancelling (implementing an ultra-low noise single photon storage regime); and feedback-based control of the quantum random number generator and information encoding. Pulse shaping and timing may additionally or alternatively be implemented in quantum/classical feedback sub-system 3030 and, in such embodiments, enables control and monitoring of light input into and output from quantum memory device 10 as well as how long the light is stored in quantum memory device 10. Such may include an FPGA SoC (single-board computer).

Persons skilled in the art will understand that the features specifically described hereinabove and shown in the associated figures are non-limiting exemplary embodiments, and that the description, disclosure, and figures should be construed merely as exemplary of particular embodiments. Therefore, it is to be understood that the present disclosure is not limited to the precise embodiments described, and that various other changes and modifications may be made by one skilled in the art without departing from the scope or spirit of the disclosure.

What is claimed is:

1. A portable, ambient-temperature quantum memory device, comprising:
   a probe input configured to receive a probe-field photon beam including quantum information, the quantum information being encoded in polarization states of one or more photons of the probe-field photon beam;
   a control input configured to receive a control-field photon beam;
   a quantum memory module optically coupled to the probe input and the control input and comprising at least one vapor cell configured to store the quantum information as photons of two independent photon beams, each of the two independent photon beams comprising a merged photon beam including a portion of the quantum information and a portion of the control-field photon beam;
   a filtering module optically coupled to the quantum memory module and configured to retrieve the quantum information therefrom; and
   an output configured to output the quantum information from the filtering module.

2. The portable, ambient-temperature quantum memory device of claim 1, further comprising:
   a first beam displacer configured to split the probe-field photon beam into two orthogonally polarized probe-field photon beams and a second beam displacer configured to split the control-field photon beam into two orthogonally polarized control-field photon beams; and
   a Glan-Thomson polarizing beam splitter configured to merge corresponding ones of the two orthogonally polarized probe-field photon beams and the two orthogonally polarized control-field photon beams to form the two independent photon beams.

3. The portable, ambient-temperature quantum memory device of claim 1, wherein the at least one vapor cell contains a buffer gas and one of $^{87}$Rb atoms or Cs atoms.

4. The portable, ambient-temperature quantum memory device of claim 1, wherein the quantum memory module further comprises at least one heater configured to heat the at least one vapor cell and at least one controller configured to control an output of the at least one heater and control a temperature of the at least one vapor cell.

5. The portable, ambient-temperature quantum memory device of claim 1, wherein the quantum memory module is a dual-rail quantum memory and comprises electromagnetically induced transparency-based storage for each rail of the dual-rail quantum memory.

6. The portable, ambient-temperature quantum memory device of claim 1, wherein the filtering module is configured to retrieve the quantum information as either photons of the two independent photon beams or as photons of a combined photon beam, the combined photon beam comprising the two independent photon beams.

7. The portable, ambient-temperature quantum memory device of claim 6, wherein the filtering module is configured to combine the two independent photon beams into a first photon beam, to split the first photon beam into two separate photon beams, and to re-combine the two separate photon beams into a second photon beam comprising the quantum information for output via the output.

8. The portable, ambient-temperature quantum memory device of claim 6, wherein the filtering module comprises a series of optical elements configured to separate the control-field photon beam and the probe-field photon beam to retrieve the quantum information stored in the probe-field photon beam.

9. The portable, ambient-temperature quantum memory device of claim 1, further comprising an outer shell, an inner structural frame within the outer shell, and a board disposed within the outer shell and supported by the inner structural frame.

10. The portable, ambient-temperature quantum memory device according to claim 9, wherein the board supports the quantum memory module.

11. The portable, ambient-temperature quantum memory device of claim 1, wherein the portable, ambient-temperature quantum memory device is configured to operate with a fidelity having a value greater than 90%.

12. A method of ambient-temperature quantum information storage, comprising:
receiving a probe-field photon beam including quantum information, the quantum information being encoded in polarization states of one or more photons of the probe-field photon beam;
splitting the probe-field photon beam into first and second independent probe-field beams;
receiving a control-field photon beam;
splitting the control-field photon beam into first and second independent control beams;
merging the first and second independent control beams with the respective first and second independent probe beams to provide two independent photon beams; and
storing the two independent photon beams in a quantum memory vapor cell assembly including at least one vapor cell.

13. The method of ambient-temperature quantum communication storage of claim 12, further comprising preparing the control-field photon beam after receiving the control-field photon beam.

14. The method of ambient-temperature quantum communication storage of claim 13, wherein preparing the control-field photon beam comprises at least one of shaping the control-field photon beam and/or time-optimizing the control-field photon beam to the probe-field photon beam.

15. The method of ambient-temperature quantum communication storage of claim 12, wherein the probe-field photon beam comprises a pulsed beam wherein each pulse of the pulsed beam includes, on average, one photon.

16. The method of ambient-temperature quantum communication storage of claim 12, wherein the probe-field photon beam has a wavelength between 780 nm and 850 nm.

17. The method of ambient-temperature quantum communication storage of claim 12, wherein storing the two independent photon beams comprises storing the quantum information with a fidelity having a value greater than 90%.

18. A method of ambient-temperature retrieval of stored quantum information, the method comprising:
receiving quantum information from a quantum memory, wherein the quantum information is received in a form of two independent photon beams each comprising a portion of the quantum information and a portion of a control-field photon beam;
combining the two independent photon beams into a first photon beam;
splitting the first photon beam into two separate photon beams;
re-combining the two separate photon beams into a second photon beam; and
after re-combining the two separate photon beams, performing filtering to remove photons of the control-field photon beam while preserving the quantum information.

19. The method of ambient-temperature retrieval of stored quantum information of claim 18, wherein performing filtering comprises using a Fabry-Perot etalon or a Fabry-Perot etalon in combination with a Faraday isolator.

20. The method of ambient-temperature retrieval of stored quantum information of claim 18, further comprising:
after performing filtering, obtaining a third photon beam comprising the quantum information; and
outputting the third photon beam.

21. The method of ambient-temperature retrieval of stored quantum information of claim 18, wherein performing filtering comprises retrieving the quantum information with a fidelity having a value greater than 90%.

22. A method of ambient-temperature quantum communication, comprising:
storing quantum information, the storing comprising:
receiving a probe-field photon beam comprising quantum information encoded in polarization states of one or more photons of the probe-field photon beam;
splitting the probe-field photon beam into first and second independent probe-field photon beams, each comprising a portion of the quantum information;
receiving a control-field photon beam;
splitting the control-field photon beam into first and second independent control-field photon beams;
merging the first and second independent control-field photon beams with the respective first and second independent probe-field beams to provide two independent, merged photon beams, each of the two independent, merged photon beams comprising a portion of the quantum information; and
storing the two independent, merged photon beams in a quantum memory vapor cell;
retrieving the quantum information after storing the quantum information, the retrieving comprising:
receiving the quantum information in a form of the two independent, merged photon beams from the quantum memory vapor cell;
combining the two independent, merged photon beams into a first photon beam;

splitting the first photon beam into two separate photon beams;
re-combining the two separate photon beams into a second photon beam; and
after re-combing the two separate photon beams, performing filtering to obtain a third photon beam by removing photons of the control-field photon beam while preserving the quantum information; and
outputting the third photon beam comprising the quantum information.

* * * * *

UNITED STATES PATENT AND TRADEMARK OFFICE
CERTIFICATE OF CORRECTION

PATENT NO. : 11,218,228 B2
APPLICATION NO. : 17/042054
DATED : January 4, 2022
INVENTOR(S) : Eden Figueroa et al.

Page 1 of 1

It is certified that error appears in the above-identified patent and that said Letters Patent is hereby corrected as shown below:

In the Specification

Column 1, Line 21, please add the following paragraph after the CROSS-REFERENCE TO RELATED APPLICATIONS paragraph and before the BACKGROUND paragraph:
FEDERALLY SPONSORED RESEARCH
This invention was made with government support under DE-SC0019702 awarded by the U.S. Department of Energy. The government has certain rights in the invention.

Signed and Sealed this
Eleventh Day of February, 2025

Coke Morgan Stewart
*Acting Director of the United States Patent and Trademark Office*